(12) United States Patent
Isner et al.

(10) Patent No.: US 8,139,068 B2
(45) Date of Patent: Mar. 20, 2012

(54) THREE-DIMENSIONAL ANIMATION OF SOFT TISSUE OF CHARACTERS USING CONTROLS ASSOCIATED WITH A SURFACE MESH

(75) Inventors: Michael Isner, Santa Monica, CA (US); Thomas Ho-min Kang, Vonica, CA (US); Javier Nicolai von der Pahlen, New York, NY (US)

(73) Assignee: AUTODESK, Inc., San Rafael, CA (US)

( * ) Notice: Subject to any disclaimer, the term of this patent is extended or adjusted under 35 U.S.C. 154(b) by 708 days.

(21) Appl. No.: 11/493,220

(22) Filed: Jul. 26, 2006

(65) Prior Publication Data

US 2007/0035541 A1     Feb. 15, 2007

Related U.S. Application Data

(60) Provisional application No. 60/703,909, filed on Jul. 29, 2005.

(51) Int. Cl.
    *G06T 13/00* (2011.01)
(52) U.S. Cl. ........ 345/474; 345/419; 345/420; 345/473; 345/428; 345/582; 382/115; 382/154
(58) Field of Classification Search .................. 345/418, 345/419, 420, 473, 474; 703/2, 10; 382/118, 382/154, 159, 190, 224, 254, 260, 291
See application file for complete search history.

(56) References Cited

U.S. PATENT DOCUMENTS 5,995,119 A * 11/1999 Cosatto et al. ................ 345/473

(Continued)

FOREIGN PATENT DOCUMENTS

JP     2003-196678     7/2003

OTHER PUBLICATIONS

English Translation of JP 2003-196678.

(Continued)

*Primary Examiner* — Andrew Wang
*Assistant Examiner* — Abderrahim Merouan
(74) *Attorney, Agent, or Firm* — Patterson & Sheridan, LLP

(57) ABSTRACT

A face, as well as any other soft tissue of a character, can be animated much in the same way that a skeleton is animated by creating a soft tissue solver attached to the surface mesh. In particular, deformation objects are associated with regions of the surface mesh. The deformation objects deform the mesh according to deformation operators in response to a change in a control object. This soft tissue solver can be generated automatically given a set of salient points specified on an input mesh and a format file for the class of objects of which the input mesh is an example. The format file specifies what the salient points are, and the relative placement of the deformation objects and control objects as functions of the salient points. Specific deformation operators can be defined and associated, through the format file, with the deformation objects and control objects. The format file for a class of objects, such as for human and humanoid heads, and related operators can be determined based on experimentation and observation of the object being modeled. Through such a soft tissue solver, the behavior of the deformation of the surface mesh is quantified and controlled by direct manipulation of the points on the mesh. Thus, the surface of the object can be animated in a manner similar to how animation of a skeleton is defined using inverse kinematics. Because the surface of the object is directly related to its appearance or aesthetics, this animation capability is referred to herein as "quantitative aesthetics."

27 Claims, 18 Drawing Sheets

U.S. PATENT DOCUMENTS

| | | | | |
|---|---|---|---|---|
| 6,031,539 | A * | 2/2000 | Kang et al. | 345/419 |
| 6,064,390 | A * | 5/2000 | Sagar et al. | 345/420 |
| 6,300,960 | B1 * | 10/2001 | DeRose et al. | 345/474 |
| 6,532,011 | B1 * | 3/2003 | Francini et al. | 345/420 |
| 6,556,196 | B1 * | 4/2003 | Blanz et al. | 345/419 |
| 6,664,956 | B1 * | 12/2003 | Erdem | 345/419 |
| 7,116,330 | B2 * | 10/2006 | Marshall et al. | 345/474 |
| 7,289,124 | B2 * | 10/2007 | Breton et al. | 345/473 |
| 2002/0012454 | A1 * | 1/2002 | Liu et al. | 382/118 |
| 2002/0016700 | A1 * | 2/2002 | Furusu et al. | 703/6 |
| 2002/0106114 | A1 * | 8/2002 | Yan et al. | 382/118 |
| 2003/0007666 | A1 * | 1/2003 | Stewartson et al. | 382/103 |
| 2003/0031344 | A1 * | 2/2003 | Maurer et al. | 382/103 |
| 2003/0088389 | A1 * | 5/2003 | Balaniuk et al. | 703/2 |
| 2003/0160791 | A1 * | 8/2003 | Breton et al. | 345/473 |
| 2003/0223622 | A1 * | 12/2003 | Simon et al. | 382/118 |
| 2004/0095352 | A1 * | 5/2004 | Huang | 345/473 |
| 2004/0170337 | A1 * | 9/2004 | Simon et al. | 382/254 |
| 2004/0220789 | A1 * | 11/2004 | Thore et al. | 703/10 |
| 2005/0047630 | A1 * | 3/2005 | Liu et al. | 382/118 |
| 2005/0147280 | A1 * | 7/2005 | Yan et al. | 382/118 |
| 2005/0213820 | A1 * | 9/2005 | Liu et al. | 382/190 |
| 2005/0256686 | A1 * | 11/2005 | Stabelfeldt et al. | 703/6 |
| 2008/0180448 | A1 * | 7/2008 | Anguelov et al. | 345/475 |

OTHER PUBLICATIONS

Suzaki, et al. "Construction of Human Interface Using Facial Images", Media and Recognition Science, Japan, Japanese Society of Artificial Intelligence, May 19, 1995,. pp. 30-37. (English Translation provided as explanation of relevance).

Sato, et al. "3D Human Face Image Reconstruction Using Shape Deformation Based on Facial Muscle Movement and Texture Remapping", Japan, the institute of Electronics, Information and Communication Engineering, Jul. 1, 2005, vol. J88-D-II, No. 7, pp. 1126-1142. (English Translation provided as explanation of relevance).

Partial English Translation of B3. (Provided as explanation of relevance).

Bando, et al. "Simulation of Facial Expression with Wrinkles", research report of the Institute of Information, Processing 2001-CG-105, Japan, Nov. 9, 2001, vol. 2001, No. 106, pp. 27-32.

Partial English Translation of B5, (Provided as explanation of relevance).

Ahn, et al. "Estimating of Muscular Contraction Parameters Using Facial Feature Points," Dept. of Information and Computer Science, Keio University, 2004. (English abstract provided as explanation of relevance).

* cited by examiner

THREE-DIMENSIONAL ANIMATION OF SOFT TISSUE OF CHARACTERS USING CONTROLS ASSOCIATED WITH A SURFACE MESH

CROSS REFERENCE TO RELATED APPLICATION

This application claims the benefit of priority to U.S. Provisional application Ser. No. 60/703,909 filed Jul. 29, 2005 and entitled "Three-Dimensional Animation of Soft Tissue of Characters Using Controls Associated with a Surface Mesh", the contents of which are incorporated herein by reference.

BACKGROUND

In computer animation, a character generally is defined by a topology, often called a skeleton, and an associated geometry, often called a skin or envelope. The topology includes a number of interconnected elements. Each element in the topology is defined in three dimensions by a position and orientation, which may include direction and rotation. Various algorithms control the relationship between the topology and the geometry to produce the look of a character.

Various techniques may be used to manipulate a character to provide the appearance of animation. Generally, such techniques involve associating one or more animation controls with one or more elements of the topology in a process called rigging. One technique is to specify a series of key frames that describe motion of the character over time, using a combination of inverse and forward kinematics and character rigging techniques. Another technique is to use motion capture data representing the position and orientation of selected elements of the topology of a character over time. Other animation techniques include using constraints, scripts or expressions.

Realistic animation of facial expressions, however, is a difficult problem in computer animation. In contrast with the rest of the body of the character, there are only a few parts of the skeleton that can move, i.e., the jaw and the neck. Thus, all other movement of the face that can be animated involves simulating motion of the soft tissue.

Realistic animation of facial expressions is an important problem in computer animation because the face is the primary means through which emotion is expressed. An artist needs to have animation controls that permit subtle changes to the face to be made. Lack of subtlety or realism limits the ability of an animated character to convey emotion and to be perceived as a realistic actor.

Several techniques have evolved to address the problem of face animation, including creating models of muscle systems to mimic the soft tissue behavior, carefully defining poses of a surface mesh by hand and morphing between such poses, and using motion capture to directly control the three-dimensional position of points of a surface mesh. All of these techniques are labor intensive. For animation that is part of a major motion picture release, such as in POLAR EXPRESS, THE INCREDIBLES, and the GOLLUM character in the LORD OF THE RINGS, realistic and complex animation of faces often involves many months of labor by a team of animators.

SUMMARY

A face, as well as any other soft tissue of a character, can be animated much in the same way that a skeleton is animated by creating a soft tissue solver attached to the surface mesh. In particular, deformation objects are associated with regions of the surface mesh. The deformation objects deform the mesh according to deformation operators in response to a change in a control object. This soft tissue solver can be generated automatically given a set of salient points specified on an input mesh and a format file for the class of objects of which the input mesh is an example. The format file specifies what the salient points are, and the relative placement of the deformation objects and control objects as functions of the salient points. Specific deformation operators can be defined and associated, through the format file, with the deformation objects and control objects. The format file for a class of objects, such as for human and humanoid heads, and related operators can be determined based on experimentation and observation of the object being modeled.

Through such a soft tissue solver, the behavior of the deformation of the surface mesh is quantified and controlled by direct manipulation of the points on the mesh. Thus, the surface of the object can be animated in a manner similar to how animation of a skeleton is defined using inverse kinematics. Because the surface of the object is directly related to its appearance or aesthetics, this animation capability is referred to herein as "quantitative aesthetics." This process creates components based on heuristic analysis of both the exterior, interior and shifting interrelationships within the soft tissue being represented by algorithm through quantitative aesthetics.

The graphical user interface may provide, for example, a different interface for each of the different types of objects to enable them to be viewed and adjusted separately. These objects may be interactively displayed on a rendering of the input mesh, and optionally with a rendering of selected other types of objects, to assist the user in visualizing their interrelationships.

The soft tissue solver created by using the format file and input mesh has interesting properties for different characters within the same class of objects that are created from the same format file. In particular, all characters created using the same format file will have soft tissue solvers with the same general structure. Thus, the format file defines a canonical soft tissue solver for the class of objects it represents. Because soft tissue solvers for different characters will have the same general structure, various animation information, including but not limited to both motion and attributes, may be transferred among the characters more easily.

With face animation, it is common for animators to want to create more realistic faces, such as faces with wrinkles. To achieve such results, the deformation operator can be understood as generating a low frequency distortion to the input mesh. In contrast, wrinkles can be understood as a high frequency distortion to an otherwise smooth surface. Thus, separate wrinkle maps associated with the input mesh, and other high frequency distortions, can be created and superimposed on the surface after the surface is deformed by the various deformation operators.

The soft tissue solver can be used to create different poses of an object, such as a face. These different poses can be key framed, and interpolation between those poses can be performed. Alternatively, motion capture can be used to manipulate the object. However, because each deformation object can be independently controlled, such interpolation or motion capture can be performed or applied locally for each deformation operator, thus providing local control and smoothing in the transitions between poses.

Also hybrid workflows combining motion capture and keyframe animation can be used with such a system.

In a most general system, the various parameters that define the deformation objects, deformation operators, control objects, and their interrelationships may all be animated based on user input. However, to reduce complexity, some of these parameters may be fixed. For example, as noted above, the guide phase involves fixing the position, size and orientation of objects in order to simplify completion of the soft tissue solver. It also may be desirable to fix all of the parameters of the deformation operators so that the deformation operators can be made to operate in real-time based on real-time, interactive modifications to the control objects. Having such real-time interactive behavior is particularly useful for games. Such deformation operators would be defined as real-time middleware used for characters in a game, for which the game engine would interactively animate the character based on user input during the game.

These solutions to animating faces can be directly applied to animating the details of any mesh, skin or envelope that represents the surface of an object.

DETAILED DESCRIPTION

Figure 1:
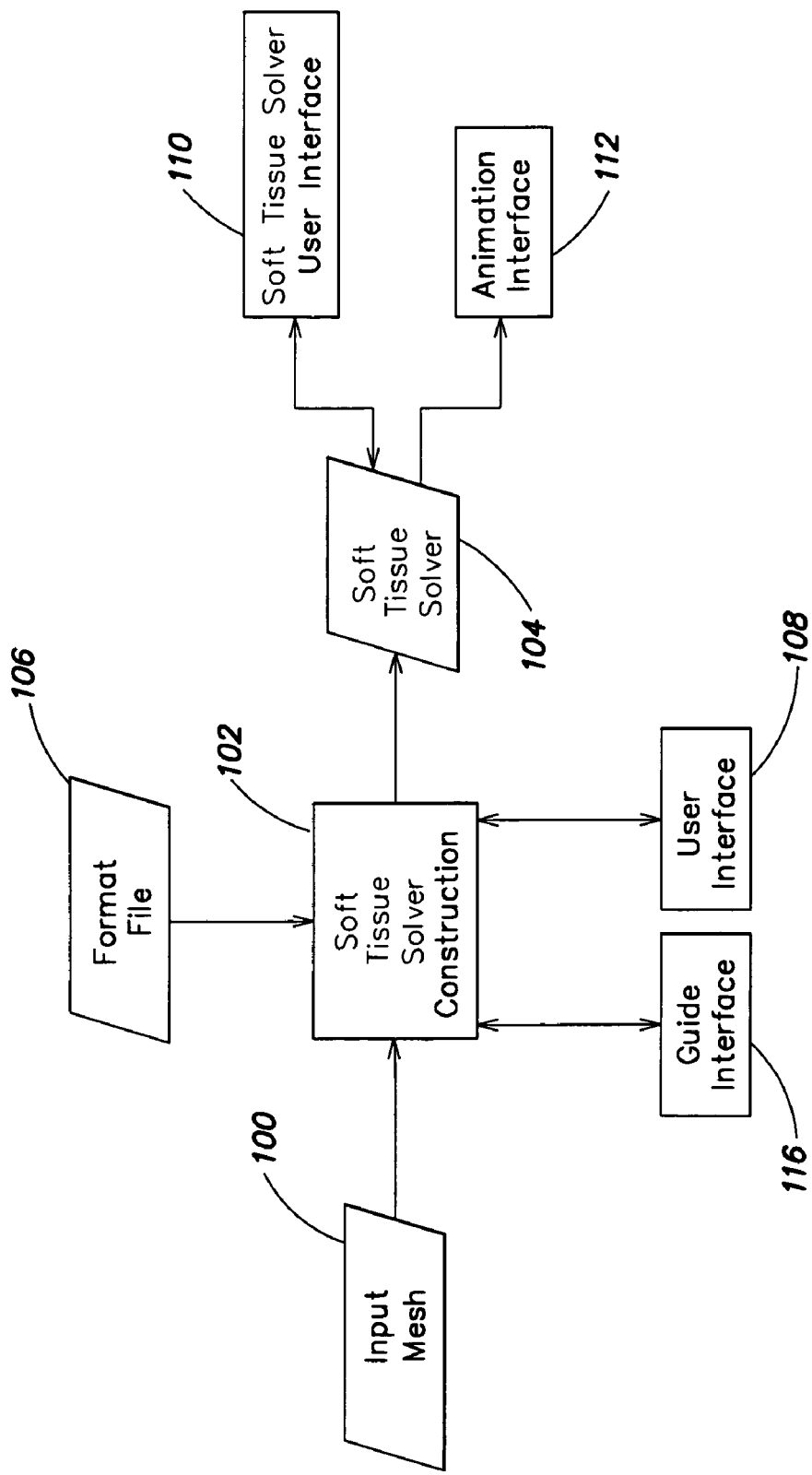
FIG. 1 is a dataflow diagram of a system for animation using quantitative aesthetics.

Referring now to FIG. 1, an implementation of an animation system based on quantitative aesthetics will now be described. A three-dimensional input mesh 100 for an object, such as a three-dimensional humanoid head and neck, is input to a constructor 102. The constructor 102 receives a format file 106, described in more detail below, which is associated with the type of the object represented by the mesh 100. A user interface 108 permits a user to specify the location of salient points on the input mesh 100. The salient points are identified for the type of object by its format file 106. Based on the information in the format file 106, the input mesh 100 and the salient points as indicated by the user, the constructor 102 automatically generates a soft tissue solver 104.

The soft tissue solver 104 includes one or more animation controls, each of which controls one or more control objects in the soft tissue solver. Deformation operators are associated with one or more control objects and manipulate deformation regions to deform the mesh according to a change in a control object. Such a change typically is a change in position, or displacement, of the control object, but may also include scaling, rotation, or even a change in a non-geometric attribute such as a color. The constructor also includes a guide interface 116, described in more detail below, which permits a user to modify parameters of the deformation regions, deformation operators, control objects and animation controls before the soft tissue solver is generated.

Given a soft tissue solver 104, a soft tissue solver interface 110, described in more detail below, permits a user to view and tune the structure of the soft tissue solver. The interface 110 displays different layers of the soft tissue solver in response to user requests. The interface 110 also permits the user to modify parameters of the soft tissue solver 104. An animation interface 112 makes available to an animator one or more of the control objects from the soft tissue solver 104 to permit the animator to define animation of the mesh.

The input mesh 100 is generally a three dimensional geometrical primitive, such as a polygon mesh, a NURBS surface mesh or other object that is a combination of vertices and edges that define faces in three dimensions. A three dimensional geometrical primitive G generally is defined as a set of n control vertices $V=\{V_i:1<=i<=n\}$, each being associated to a position triplet $P_{Vi}=(x_i, y_i, z_i)$. An example of a three-dimensional geometrical primitive is a mesh. A mesh is defined by specifying faces, vertices and edges. The vertices and edges define n-sided faces.

A mesh generally is represented in a computer by three arrays that store information about the vertices, edges (whether line segments or curves) and faces (whether planar or not). The data structure representing each vertex may include, for example, data defining its position as well as the indices of the neighboring edges and faces. The data structure representing each edge may include, for example, data defining the indices of its end vertices and the indices of the two adjacent faces. The data structure representing each face may include, for example, data defining the indices of its neighboring faces, edges and vertices.

The input mesh 100 for an object should be, but is not required to be, "well-formed", so that all faces defined by the loops in the mesh are non-intersecting, front-facing and non-degenerate, i.e., its vertices do not overlap its other vertices and its edges do not intersect its other edges. Most meshes used in production meet this criteria.

The input mesh 100 for an object should exhibit characteristics that are typical for the type of object being created. These characteristics also are assumed in the structure of the format file 106. In the examples below, a face mesh is used for illustration purposes. The invention is applicable to animating soft tissue of any part of an animated character, including but not limited to a head, a head and neck, an arm, a hand, a shoulder, a leg, a foot or any other part of the character. For a face, the format file 106 may, for example, reflect an expectation that the user will provide a face mesh, two eyeball meshes and upper and lower teeth meshes. The input mesh 100, in such a case, should include a face mesh, two eyeball meshes and upper and lower teeth meshes.

The structure of the format file 106 sets forth the various objects that will need to be either user-specified or computed to generate a soft tissue solver. In particular, the format file 106 sets forth a list of components of the mesh and deformers. The components of the mesh may include lists of salient points, helper points, guide curves, and optionally other information. The format file 106 also may indicate how helper points are derived from salient points and other helper points and how guide curves are derived from salient points and helper points. The deformers may include lists of deformation regions, deformation operators, and optionally other information. The format file 106 also may indicate how deformation regions and deformation operators are defined with respect to these points and curves, and how they are associated with these points and curves.

The actual content of a format file 106 for a type of object, and the corresponding characteristics to be exhibited by the input mesh 100, are a matter of artistic selection. Such artistic selection might be informed, for example, through experimentation and observation of the behavior of typical parts of real characters on which an animated character is to be based. For example, one may take several pictures of different faces in different poses to identify the ways in which the cheeks move. This information can be used to identify distinct deformation regions, salient points, helper points and guide curves. Actual position data could be collected and used, through a curve fitting process, to define this behavior quantitatively.

Figure 2:
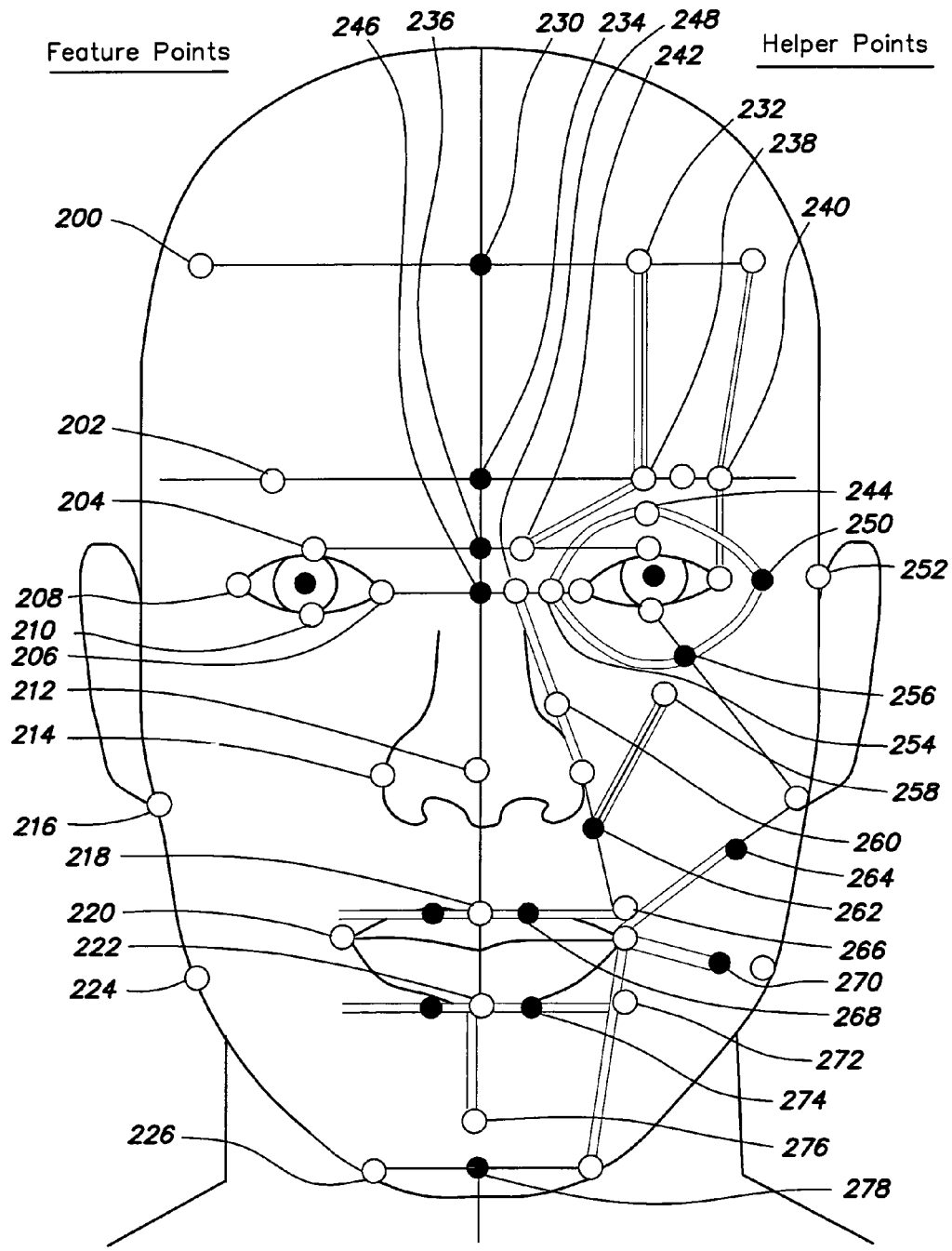
FIG. 2 is a diagram of an example head with salient points and helper points.

The salient points named in the format file are associated with points on the input mesh that are designated by the operator. For example, using the mesh representing a face as shown in FIG. 2, such salient points may include the temple 200, an eyebrow peak 202, and eye top 204, a near eye corner 206, a far eye corner 208, an eye bottom 210, a nose tip 212, a nostril bulge 214, an earlobe join 216, an upper lip 218, a mouth corner 220, a lower lip 222, a jaw corner 224 and a chin corner 226. All of these points except the nose tip 212 and upper and lower lips 218 and 222, have left and right counterparts (which may or may not be symmetrical in the input mesh). These points may ultimately have associated controls for animation, which may be key-framed and to which motion capture data can be attached.

The salient points specified by the format file 106 may be determined as a matter of artistic selection as informed by observation and experiment. The format file is created for a "species" or class of objects, whereas the input mesh is a particular instance of such an object. Thus the salient points listed above are merely illustrative as a set of salient points that could apply to all human and humanoid faces. However, a different set of salient points also could be defined to apply to human and humanoid faces.

Figure 3:
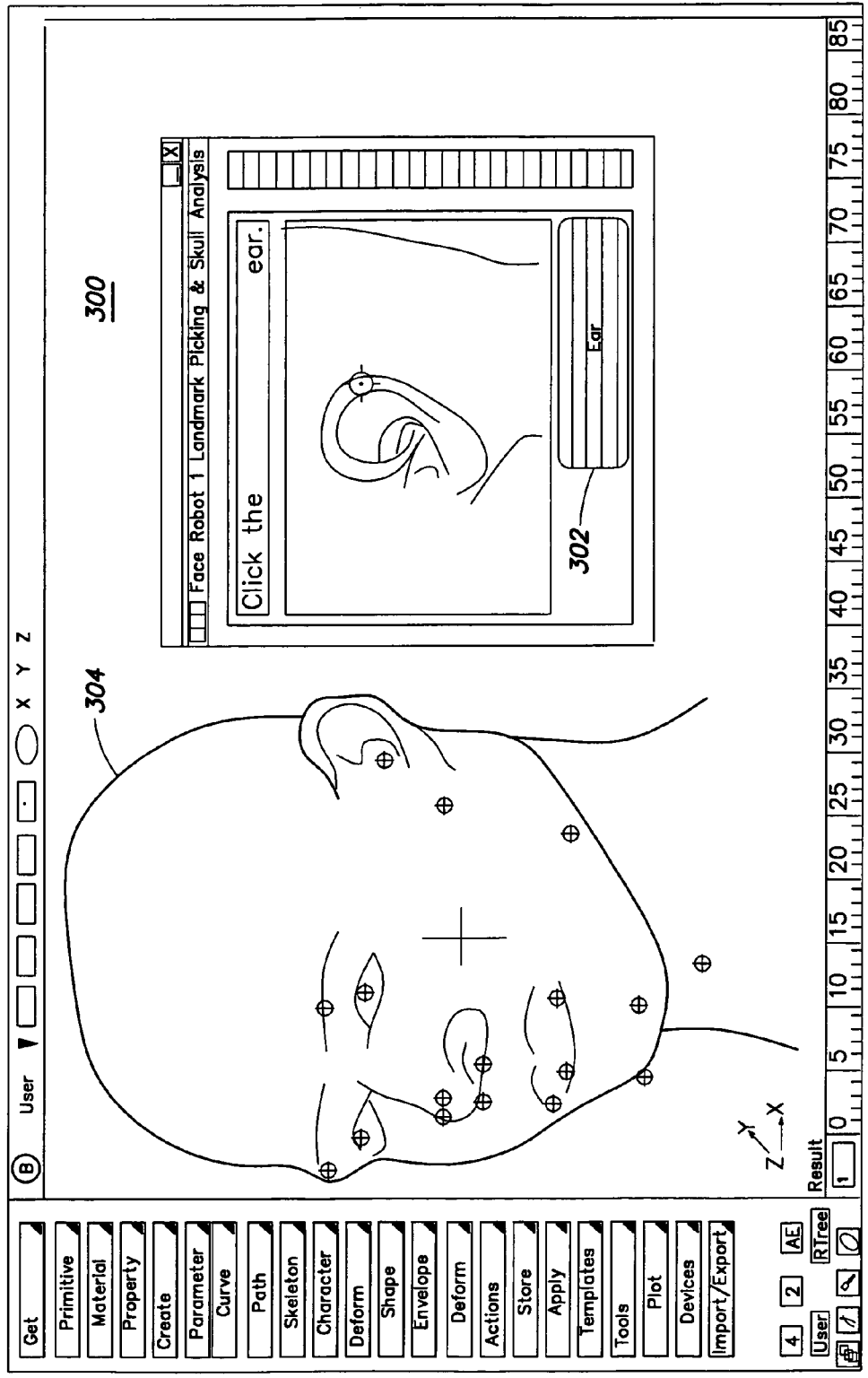
FIG. 3 is a diagram of an example graphical user interface for permitting a user to identify salient points on an input mesh.

Referring to FIG. 3, a graphical user interface 300 is provided to permit a user to specify the location of the salient points on the input mesh 100. If the input mesh 100 includes separate meshes that are combined together, as may be specified in a format file, the graphical user interface may prompt the user to select one of the meshes. In FIG. 3, a pick list 302 of the salient points is created from the list of salient points in the format file 106. The input mesh 100 is rendered and displayed as shown at 304. The user may select a salient point in the pick list 302 and then select the corresponding point on the displayed input mesh 304. Alternatively, for each salient point in the pick list 302, the user may be prompted to specify a point on the displayed input mesh 304.

Given the format file 106, the input mesh 100 and the indications of the salient points on the input mesh 100 as provided by the user through the user interface 108 (such as in FIG. 3), a soft tissue solver 104 for the object can be automatically created.

Such automatic soft tissue solver generation will now be described using an example of a face. As indicated above, the format file 106 specifies several "helper points" that are derived from the locations of the salient points provided by the user. In the example shown in FIG. 2, these helper points include the forehead midpoint 230, forehead 232, eyebrow midpoint 234, eye midpoint 236, eyebrow middle 238, eyebrow end 240, eyebrow bridge 242, eye above 244, bridge 246, nose bridge 248, outer eye 250, inner eye 254, eye edge 252, eye below 256, cheek bulge 258, nose notch 260, nostril base 262, upper jaw 264, upper mouth 266, upper lip bend 268, midjaw 270, lower mouth 272, lower lip bend 274, chin bulge 276 and chin midpoint 278. All of these points except the forehead midpoint, eyebrow midpoint, eye midpoint, bridge, and chin midpoint have left and right counterparts. Parameters that specify each of these helper points as a function of the salient points and other values are provided by the format file 106.

For example, the forehead midpoint 230 can be specified as the midpoint between the left and right temple points. The forehead 232 can be specified as the intersection of orthogonal lines formed between the forehead and the temple and the forehead and the eye top. Points also can be defined by a percentage along a line between other points or by any other function. The format file specifies, for each helper point, the name of the helper point and the function used to determine its location.

Figure 4:
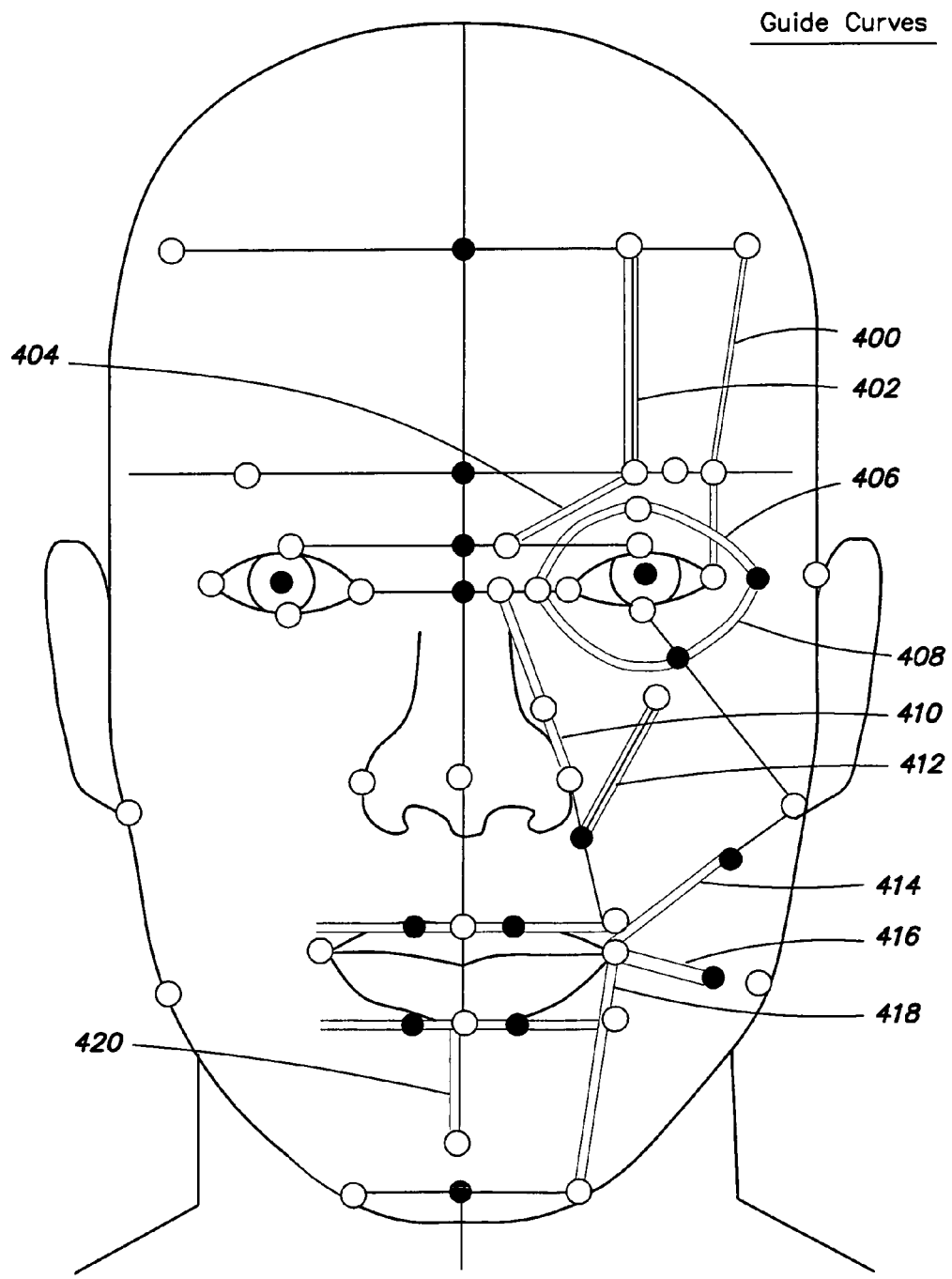
FIG. 4 is a diagram of an example head with guide curves.

After computation of the helper points, guide curves are then computed. Such guide curves also are specified by the format file and are derived from the locations of the salient points and helper points. Example guide curves for a face are illustrated in FIG. 4. In this example, the constructor 102 can create a guide curve for the chin 420 and left and right guide curves for the outer forehead 400, inner forehead 402, eyebrow 404, upper and lower orbitals 406 and 408, nose 410, cheek 412, upper jaw 414, mid jaw 416 and the lower jaw 418. As an example the chin curve 420 can be defined as a curve with the lower lip and the chin bulge as its endpoints.

Figure 5:
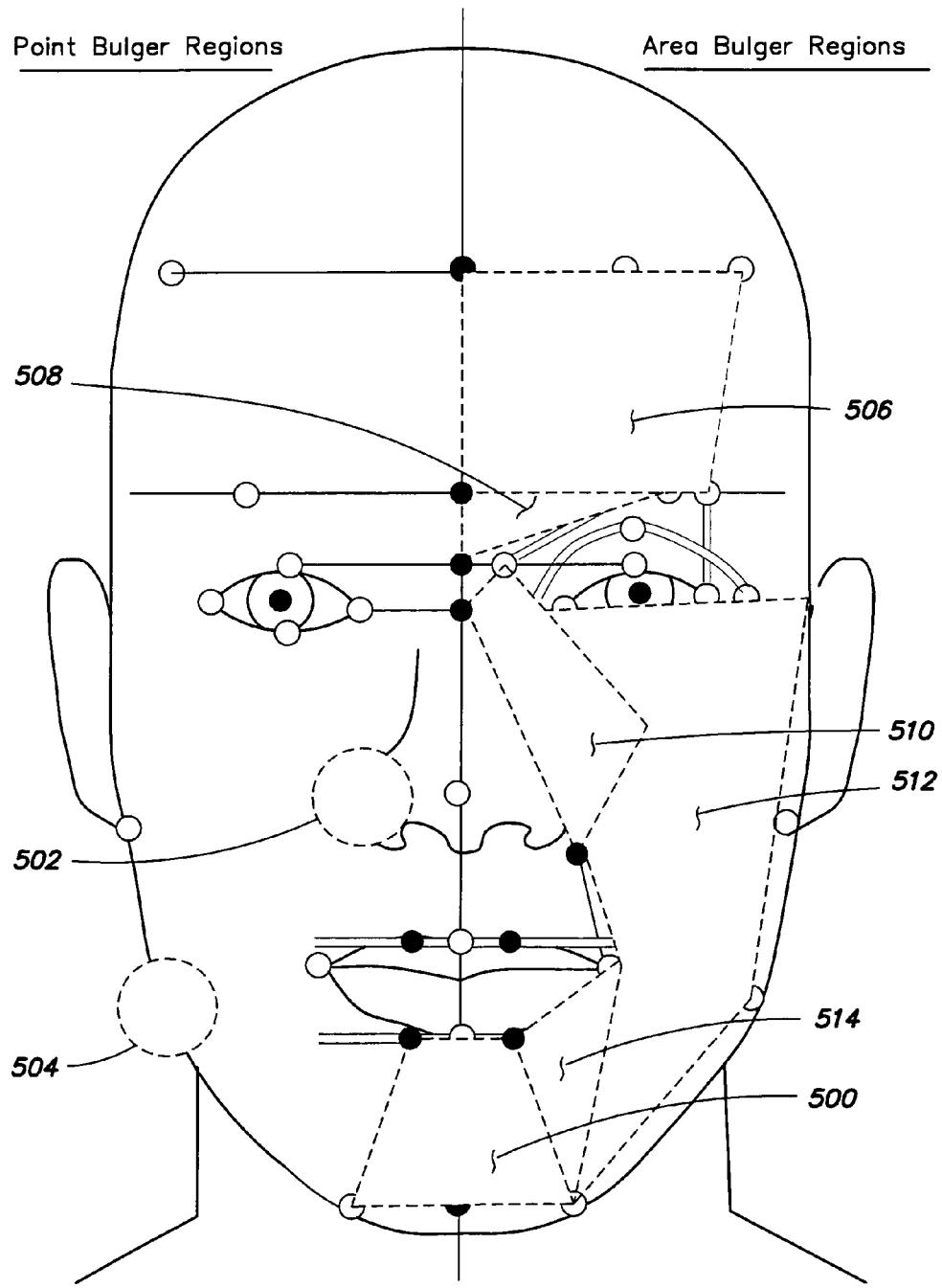
FIG. 5 is a diagram of an example head with bulger regions.

Next, deformation regions are defined. Such deformation regions also are specified by the format file and are derived from the locations of the salient points, helper points and guide curves. Example deformation regions for a face are illustrated in FIG. 5. In this example, the constructor 102 can create a deformation region for the chin 500, and left and right deformation regions for the nostril 502, jaw corner 504, forehead 506, brow 508, nose 510, cheek 512 and jaw 514. The format file provides, for each region, a name for the region, an ordered list of points that define the edges of the region, and a weight associated with that region.

Each deformation region has an associated deformation object. A deformation object has an associated deformation operator that modifies the deformation object according to changes to a corresponding control object, such as an associated point or curve. A deformation object is defined by a surface, such as a NURBS surface, or a curve. The surface indicates an amount of displacement, along the normals to the surface, that will be applied to the input mesh. This surface thus changes as part of animating the character, as a function of changes to its associated control object, resulting in the desired effect. There are several types of deformation objects, each having a different effect based on its geometry and the kind of control object with which it is associated. One type of deformation object is called a bulger and is an area associated with a curve. Another type of deformation object is called a puffer, and is an area associated with a point. Another type of deformation object is called a tendon, and is a curve associated with a curve.

Figure 6:
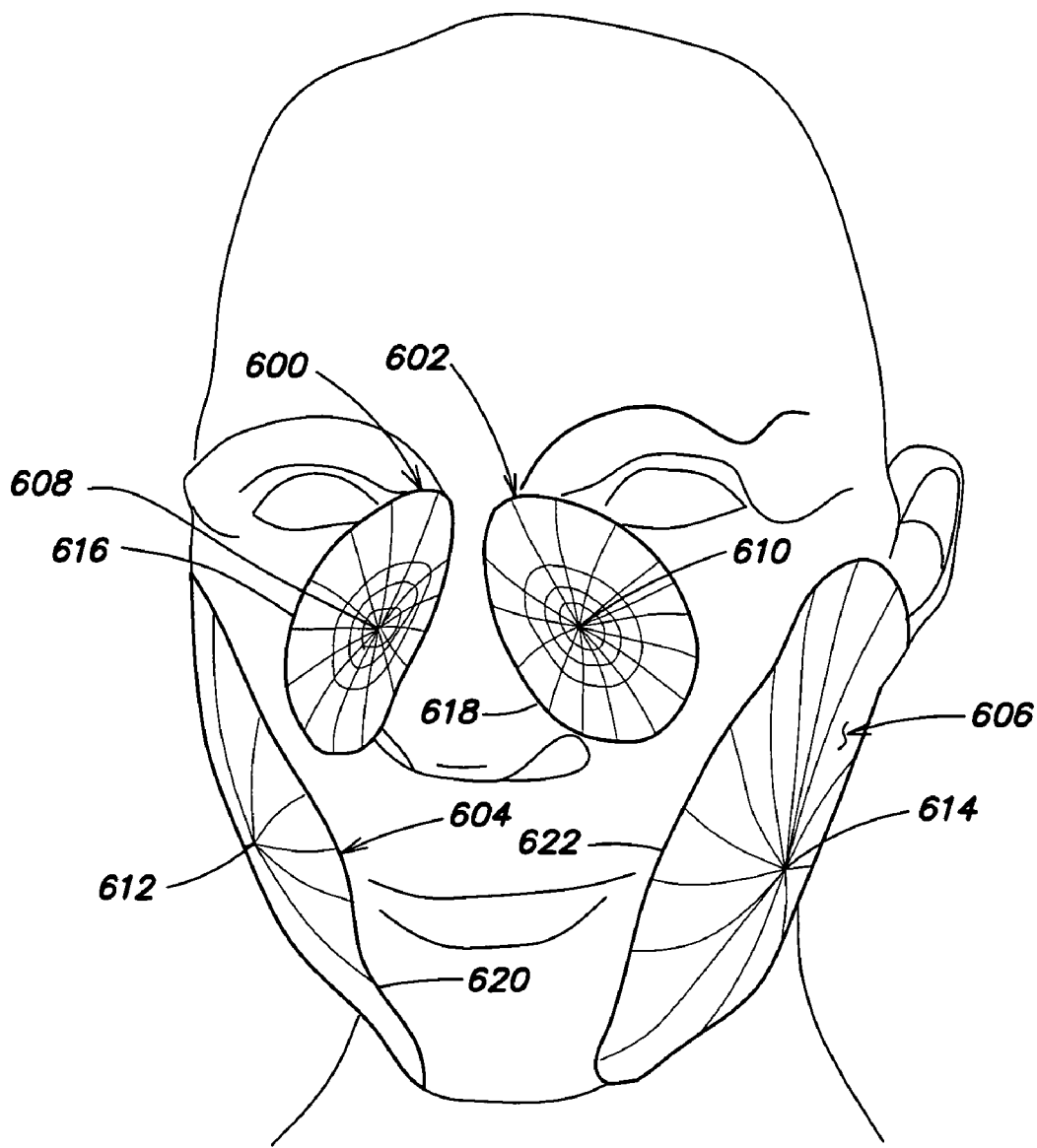
FIG. 6 is a diagram of an example head with deformation regions.

FIG. 6 illustrates, by way of example, left and right nose deformation regions 600 and 602 and left and right cheek deformation regions 604 and 606. Each of the deformation regions has a center point 608, 610, 612, 614 and a boundary 616, 618, 620 and 622.

The format file specifies the type of the deformation object, such as whether it is a bulger, puffer or tendon, the name of the object, its control object, and a specification of the surface. For example, for a NURBS surface, it may specify the sizes of the inner and outer perimeter of a mound like curve, the objects that define its perimeter and the weights to be accorded those objects in computer the center of expansion of the surface.

Special deformation objects also can be created for specific regions of a character for which specific behaviors are desired. For example, for a face, special operators may be defined for the lips (e.g., lip curlers and lip corners) and eyes (e.g., eyelids and eye balls). Examples of such deformation objects and their associated control objects and deformation operators will be described in more detail below.

After these various objects are created, the user may be permitted to adjust various parameters of them. This stage of the soft tissue solver construction is called the guide phase. In the guide phase, the position, size and other alignment related parameters of the various objects (deformation objects, deformation regions, salient points, helper points and curves) may be adjusted by the user. For this purpose, the graphical user interface 116 may be used. The graphical user interface may provide, for example, a different interface for each of the different types of objects to enable them to be viewed and adjusted separately. These objects may be interactively displayed on a rendering of the input mesh, and optionally with a rendering of selected other types of objects, to assist the user in visualizing their interrelationships.

After the user completes any adjustments in this guide phase, all of the objects are combined to create the soft tissue solver. This combination involves several steps.

Each deformation object is applied to its corresponding deformation region in the input mesh. In particular, the deformation object identifies the vertices on the input mesh that it affects. Each vertex that it affects also stores the normal vectors (e.g., in the x, y and z directions) of its corresponding point on the surface of the deformation object, along with a value representing the distance from the center of the deformation object to this correspondence point. This distance may be in the form of a percentage, a normalized distance, an absolute distance or, if the deformation object is a NURBS surface, the U value from the UV pair representing this correspondence point.

Thus, each vertex in the deformation region has associated with it 1. its relative position on the deformation object and 2. an associated direction of movement in which it will deform based on modifications to the control object associated with the deformation object. Because this information is associated with each vertex on the mesh, it is possible to permit a user to modify these values through painting operations performed on the mesh, to maintain these attributes through subdivision and polygon reduction, and to transfer these attributes to other meshes.

Deformation operators are associated with the deformation objects. These operators may be implemented, for example, as plug-ins to an animation system and may be associated with a deformation object through the format file. The deformation operators, during editing of animation, monitor changes to the control objects associated with a deformation objects and manipulate the deformation object as a function of the change to the control object.

Additionally, controllers may be created as appropriate to provide the mechanisms through which an animator can manipulate the various control objects in the soft tissue solver. A controller may control one or more control objects.

The resulting soft tissue solver provides interesting properties for different characters within the same class of objects that are created from the same format file. In particular, all characters created using the same format file will have soft tissue solvers with the same general structure. Thus, the format file defines a canonical soft tissue solver for the class of objects it represents. Because soft tissue solvers for different characters will have the same general structure, various animation information, including but not limited to both motion and attributes, may be transferred among the characters more easily.

Also, through such soft tissue solver, the behavior of the deformation of the surface mesh is quantified and controlled by direct manipulation of the points on the mesh. Thus, the surface of the object can be animated in a manner similar to the animation of a skeleton using inverse kinematics. Because the surface of the object is directly related to its appearance or aesthetics, this animation capability is referred to herein as "quantitative aesthetics."

After the soft tissue solver is created, the user may be permitted to adjust various parameters of the soft tissue solver. This stage of the soft tissue solver construction is called the soft tissue solver phase. In the soft tissue solver phase, the parameters related to the performance of the various objects, particularly the deformation applied to the surface as a function of the change to control objects, may be adjusted by the user. For this purpose, the graphical user interface 110 in FIG. 1 may be used. This graphical user interface may provide a separate interface for each of the different types of objects to enable them to be viewed and adjusted separately. These objects may be displayed interactively on a rendering of the input mesh, either alone or in combination with renderings of other objects, to assist the user in visualizing their interrelationships and performance.

Figure 7:
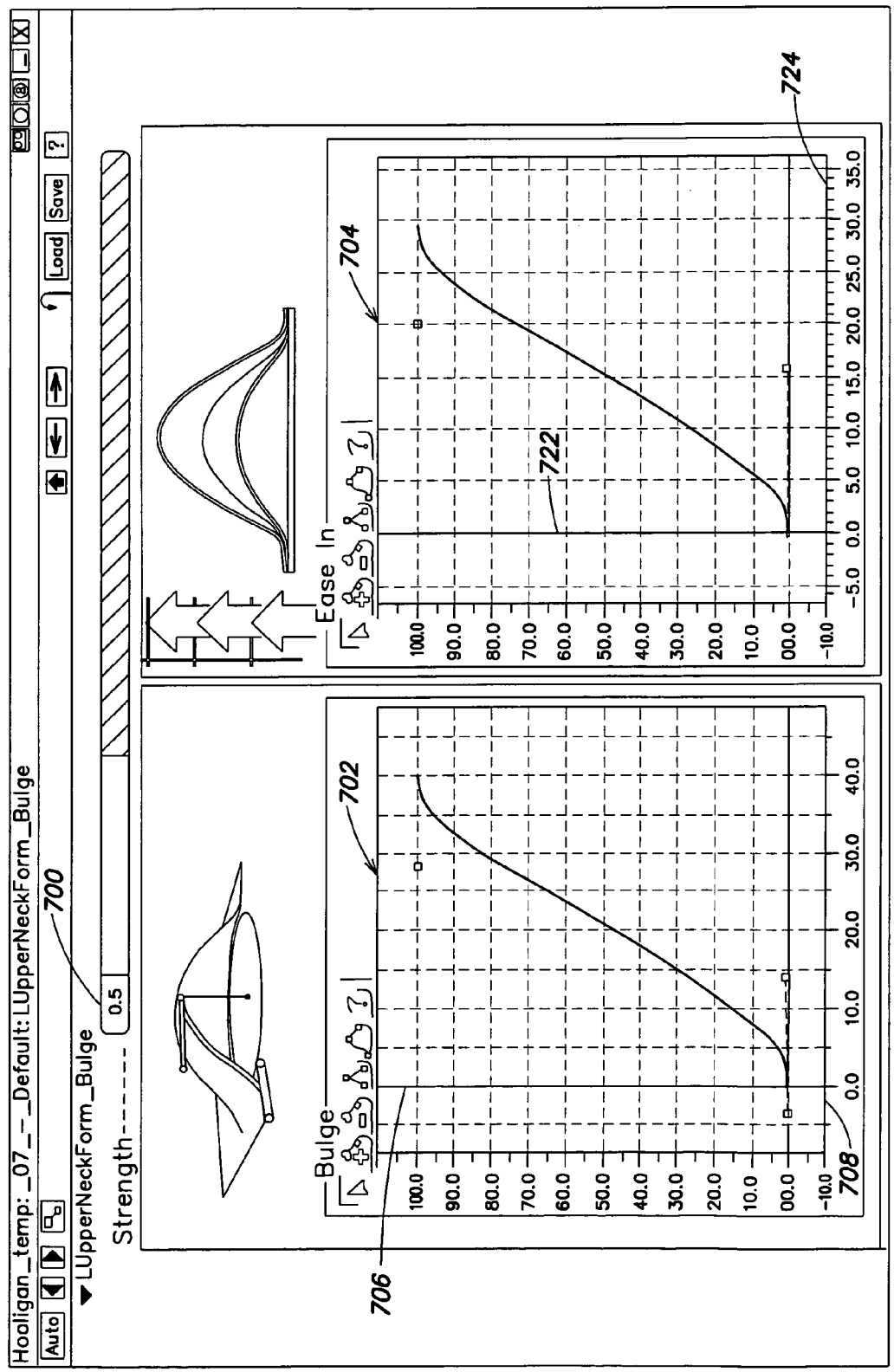
FIG. 7 is a diagram of an example graphical user interface for permitting a user to input parameters for a deformation region.

As a particular example, a deformation object is mapped after the guide phase to its corresponding deformation region, and each vertex in the deformation region thus has its relative position on the deformation object and an associated direction of movement in which it will deform based on modifications to the deformation object. After the soft tissue solver is constructed, various controls may be provided to define a function that defines the amplitude of the distortion of the mesh at each vertex as a function of the amount of change to the corresponding control object and the relative position of the vertex on the deformation object. A particular example of such a function for a bulger type of deformation operator, and a user interface through which the user may adjust parameters of this function, is shown in FIG. 7.

As an example, the function of the deformation operator may be defined by two function curves, herein called the deformation curve and the ease-in curve, and weight value. The user interface permits the user to enter the weight value W at text box 700. The deformation curve is illustrated in graph 702; the ease-in curve is illustrated in graph 704.

The function curve representing the deformation curve indicates a percentage on the y-axis 706, as a function of a scaled percentage change of the control object, on the x-axis 708. In this example shown in FIG. 7, this function curve is defined using a sigmoid function specified by two points, which may be positioned in the x-y space for the graph.

The function curve representing the ease-in curve indicates a percentage on the y-axis 722, as a function of a percentage change of the control object, on the x-axis 724. In this example shown in FIG. 7, this function curve also is defined using a sigmoid function specified by two points, which may be positioned in the x-y space for the graph. This ease-in value scales the percentage change of the control object.

Given the curves shown in FIG. 7, a deformation operator computes, for each vertex in its scope, an amplitude value based on the amount change of the corresponding control object (whether a difference in position or size). For example, if the deformation operator monitors a control curve, and the length of the curve changes by a percentage C, the value C is used as the input to the ease-in curve to obtain an ease-in percentage E. The value C is multiplied by the result E from the ease-in curve and is used as the input to the deformation curve to obtain a deformation percentage D. The value D is multiplied by the weight value W and relative position of the vertex on the deformation object.

It is possible for a vertex to be affected by two different deformation operators, such that it has a displacement amplitude and direction to be applied for each of the deformation operators. A blending operation can be performed between these two displacements.

With face animation, it is common for animators to want to create more realistic faces, such as faces with wrinkles. To achieve such results, the deformation operator can be understood as generating a low frequency distortion to the input mesh. In contrast, wrinkles can be understood as a high frequency distortion to an otherwise smooth surface. Thus, separate wrinkle maps associated with the input mesh, and other high frequency distortions, can be created and superimposed on the surface after the surface is deformed by the various deformation operators. Other example high frequency distortions include, but are not limited to, cuts, moles, make-up patterns, whiskers, hair, stubble and cracking lines.

The soft tissue solver can be used to create different poses of an object, such as a face. These different poses can be key framed, and interpolation between those poses can be performed. Alternatively, motion capture can be used to manipulate the object. However, because each deformation object can be independently controlled, such interpolation or motion capture can be performed or applied locally for each deformation operator, thus providing local control and smoothing in the transitions between poses.

In a most general system, the various parameters that define the deformation objects, deformation operators, control objects, and their interrelationships may all be animated based on user input. However, to reduce complexity, some of these parameters may be fixed. For example, as noted above, the guide phase involves fixing the position, size and orientation of objects in order to simplify completion of the soft tissue solver. It also may be desirable to fix all of the parameters of the deformation operators so that the deformation operators can be made to operate in real-time based on real-time, interactive modifications to the control objects. Having such real-time interactive behavior is particularly useful for games. Such deformation operators would be defined as real-time middleware used for characters in a game, for which the game engine would interactively animate the character based on user input during the game.

Having now described the general soft tissue solver process for some generic deformation objects, some specific deformation objects and operators that are useful for the face will now be described. Examples of such operators are operators for the lips, e.g., lip curlers and lip corners.

Operators created through quantitative aesthetics are derived from analysis of photographic, x-ray, cat scan, dissection motion capture, 3D scan capture and other mechanical devices that give information on the motion ranges of a specific region. Additional information can be obtained through interviewing artists for their expressive needs.

This data is modeled into a set of layered algorithms that simulate and modulate this motion range on the interior and exterior of the soft tissue. To achieve such a model, the observed motion ranges are broken down into levels of detail and mechanical subcomponents. An initial low level of detail is identified to create a gross definition in two-dimensions of a mechanical behavior to which the data is mapped using curve fitting, projecting, scattering point ranges and other techniques. This gross definition is iteratively refined by applying additional levels of detail. Each mapping of data at each level of detail describes a level of resolution of the mechanical behavior of the soft tissue. The data also may be mapped through many different spaces at each stage of this iterative process.

This layering of transforms creates a specific operator that solves both the mechanical ranges derived from data and observation as well as the potential needs of artist expression. This algorithm layering and blending of motion transforms is used to create a frame that controls the mechanical behavior to express a specific regions motion range. The components can be blended and grouped together to create larger regions of soft tissue. The lip curlers and corners are an example of this "quantitative aesthetics" process of creating algorithms for soft tissue motion ranges.

This design process can be applied to all operators within the soft tissue solver including but not limited to lip curlers, bulgers, puffers, and skin sliding behavior. The modular and layered design of the operators allow for them to be applied alone as well as within any body of soft tissue, thus allowing for a flexible 'soft tissue solver' that is extensible to the representation of soft tissue in any vertebrate. The lip curler, as detailed below, illustrates how such an operator works.

For example, lip curler starts off mapped to the space of the dental plane, then is mapped to the space of a line curling outward and sliding over the teeth. The lip curler then it is mapped into a thickness offset from this curve.

Similarly, an eyelid operator can be defined that takes the initial data points on the mesh, maps them into the spaces of four curves extracting the difference between them, to determine a basic state of the eyelid. This information is then mapped onto the space of the surface of the eyeball, and reprojected back out onto the initial space of the point mesh. This entire process is modulated by weight maps and function curves to produce the final result.

There may be several lip curler operators specified for a mouth of a character. For example, a middle, left and right curler operator can be provided for each of the upper and lower lips. A separate user interface for adjusting parameters of each these special operators can be provided in the user interfaces 116 and 110.

Figure 8:
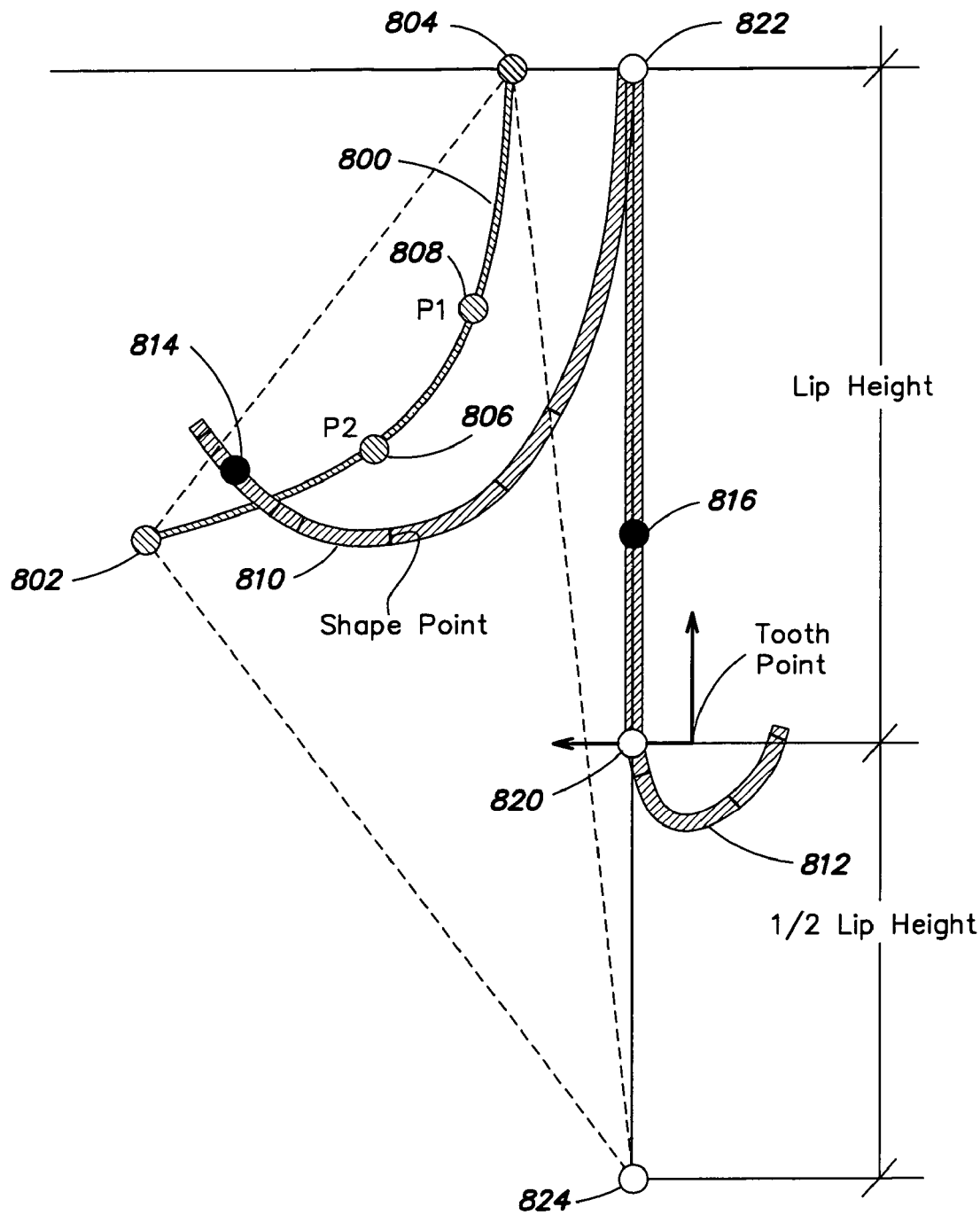
FIG. 8 is a diagram of curves and points that define an example lip curler operator.
Figure 9A:
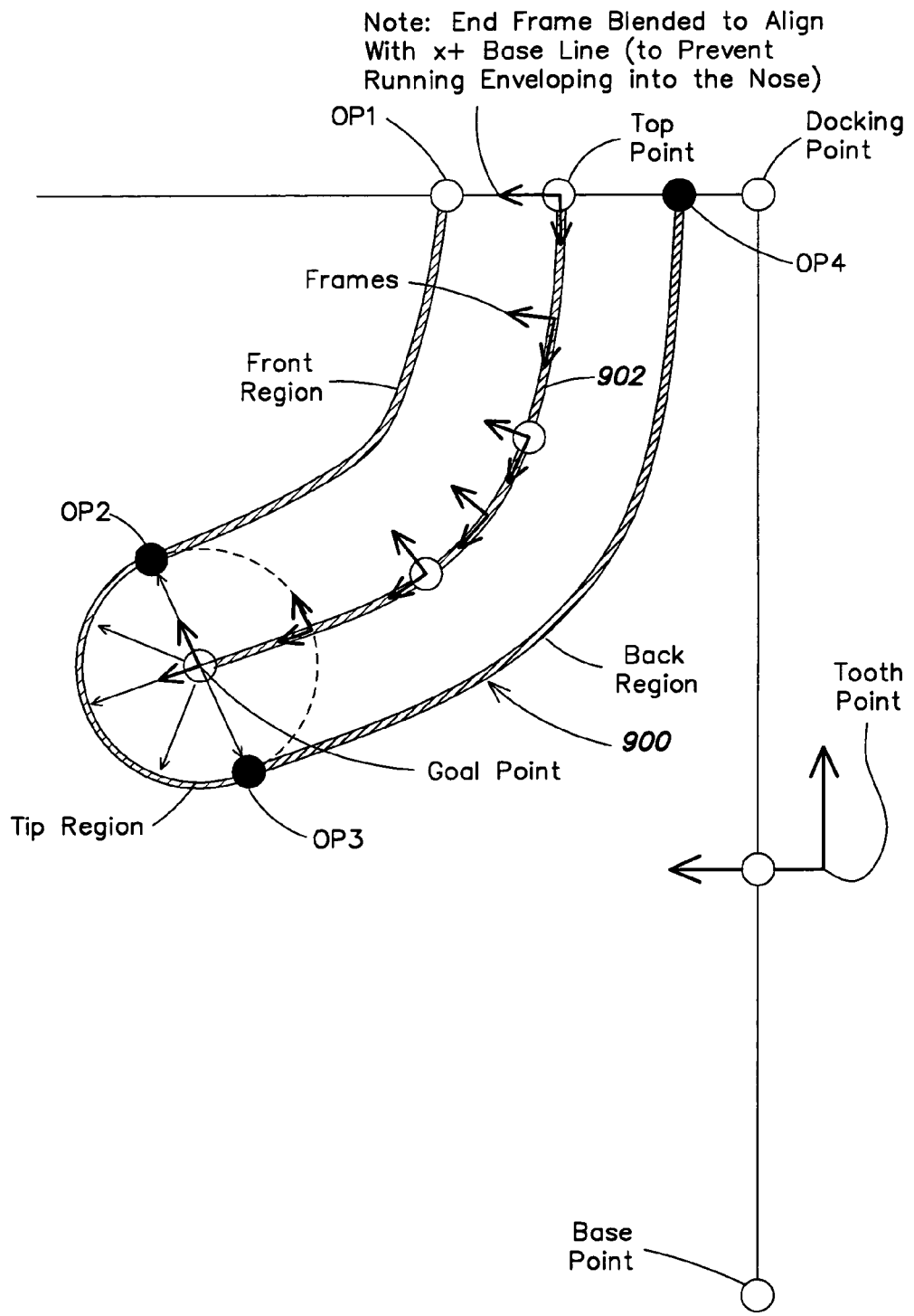
FIGS. 9A-C are diagrams illustrating the thickness parameters for a lip curler operator.
Figure 9B:
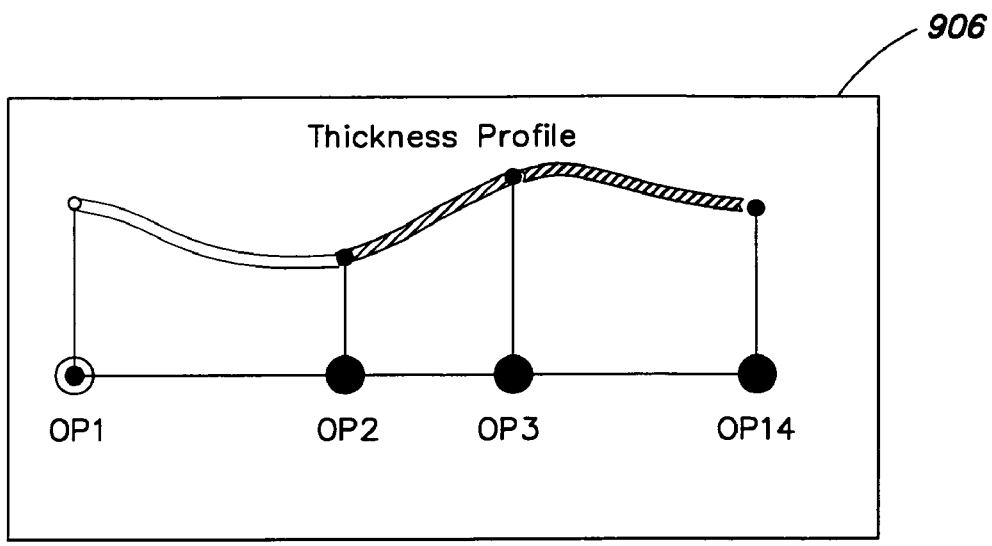
Figure 9C:
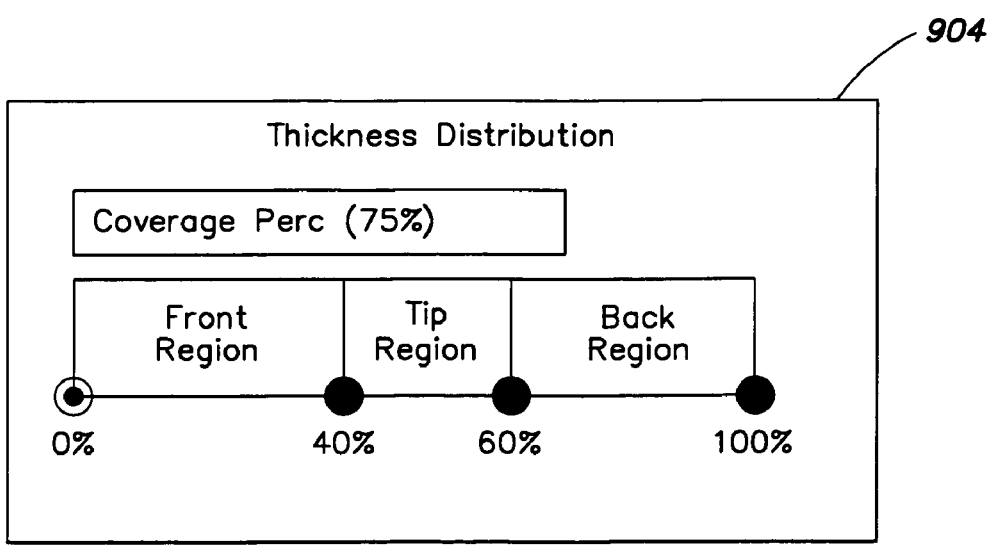

Referring now to FIGS. 8 and 9, as an example, a lip curler operator defines a center point curve 800 according to a user-specified goal point 802, a fixed top point 804 and two intermediate points P1 (806) and P2 (808) that are obtained through interpolation along a predefined curve. The limits of the range of motion of the goal point, P1 and P2 are provided by an outer blend curve 810 and an inner blend curve 812. Both curves represent the inner surface of a lip, which is a distance from the center point curve 800 based on the lip thickness. Given a goal point 802, the system computes the closest point 814 on the outer blend curve and the closest point 816 on the inner blend curve. These two points indicate the pose of the lip and help determine points P1 and P2. This information about two different poses can be used to blend between poses.

The inner and outer blend curves can be specified by function curves and related parameters that can be adjusted by the user. For example a tooth point 820 indicates a point on a tooth that the inner surface of the lip wraps around. The docking point 822 and base point 824 define the orientation of the inner blend curve. The docking point may be the same for the inner and outer blend curves, or these points may be different. The various points that define the position and orientation of the lip curler can be adjusted during the guide phase of soft tissue solver construction. The distance between the docking points for the inner and outer blend curves can be defined by a user-settable parameter, which may be called "lip-skull adhesion."

A function curve that is used to derive points P1 and P2 may be generated using a curve fitting algorithm, much like a regression, using data obtained by experimentation and observation of the positions of actual lips of humans in a variety of poses. Because the curve fit to this data describes a range of positions of the lips, its use results in the mimicking of anatomical behavior. This curve may be parameterized to permit user modification.

A lip curler also defines the thickness of the lip at its associated position on the lip by specifying the thickness profile and thickness distribution, as shown in FIG. 9. The lip is represented by an envelope 900 that surrounds the center curve 902. The envelope is defined by four points (OP1, OP2, OP3 and OP4) that identify the front region, the tip and the back region of the lip. Each region can be specified as a percentage of the total lip (see 904). The thickness along the envelope also can be specified (see 906). These parameters can be user defined.

The envelope 900 shown in FIG. 9 is a curve, which acts as a deformation object for the lip. The vertices of the input mesh are mapped to the curves of the different lip curlers to associate each point in the lip part of the mesh with a corresponding point on these curves. The control objects are the vertices associated with the goal points of the lip curlers. Each lip curler monitors its corresponding goal point and in turn computes the positions P1 and P2, and applies the thickness function to define the envelope 900. Poses for the different lip curlers along the mouth may be interpolated. These positions P1 and P2 are mapped to different deformations of the input mesh by the function associated with the lip curler operator.

Figure 10:
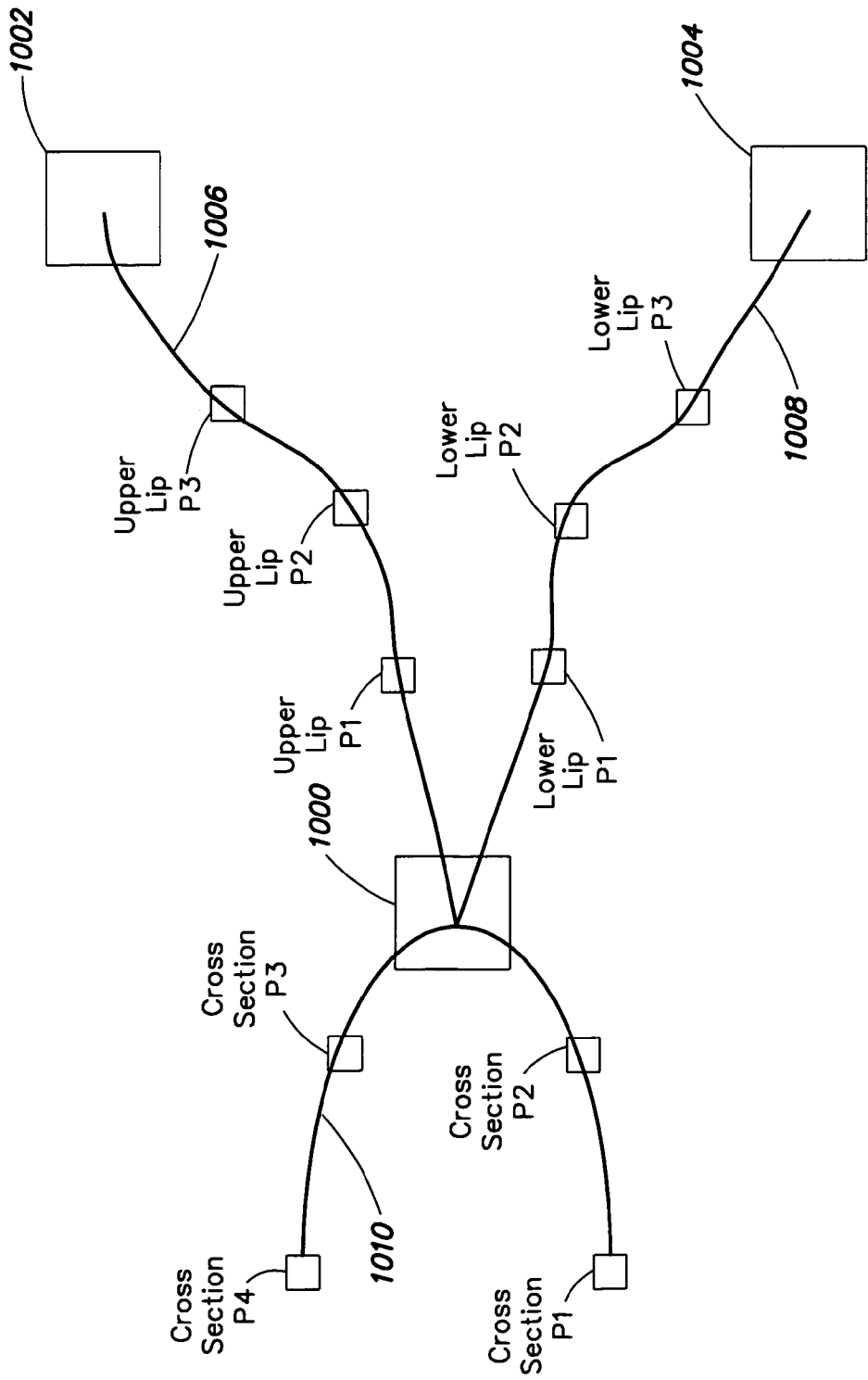
FIG. 10 is a diagram illustrating curves and points for an example lip corner operator.
Figure 11A:
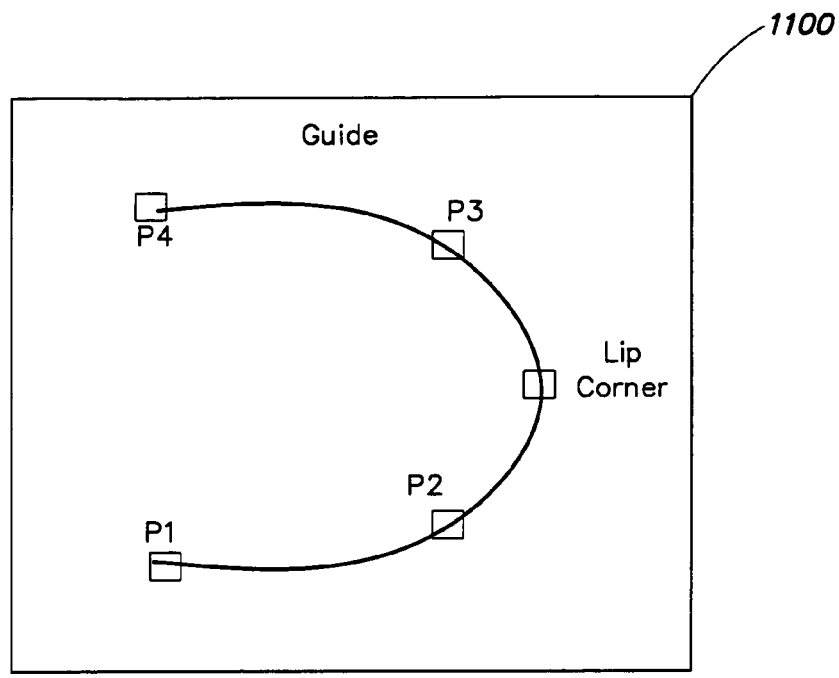
FIGS. 11A-F are diagrams illustrating parameters for a lip corner operator.
Figure 11B:
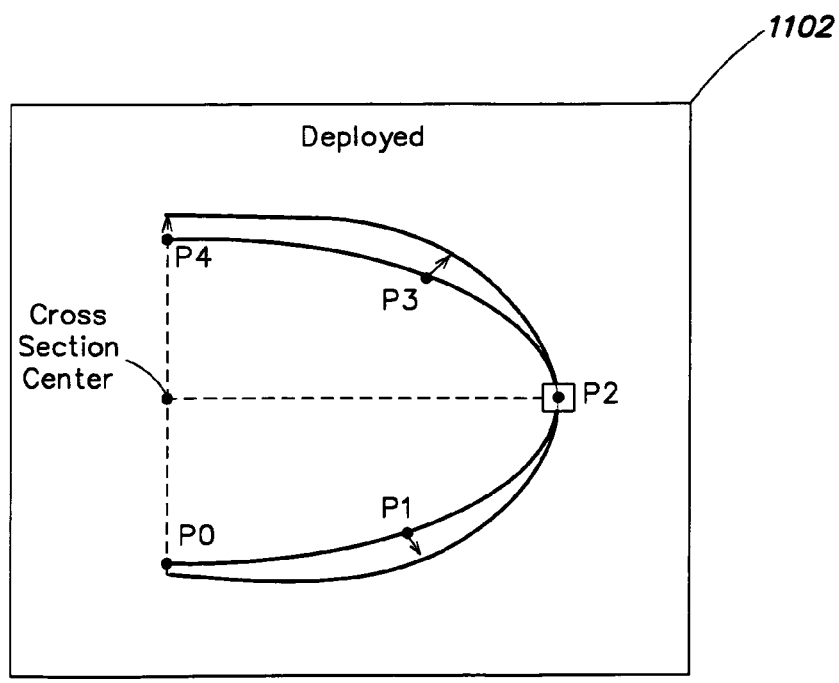
Figure 11C:
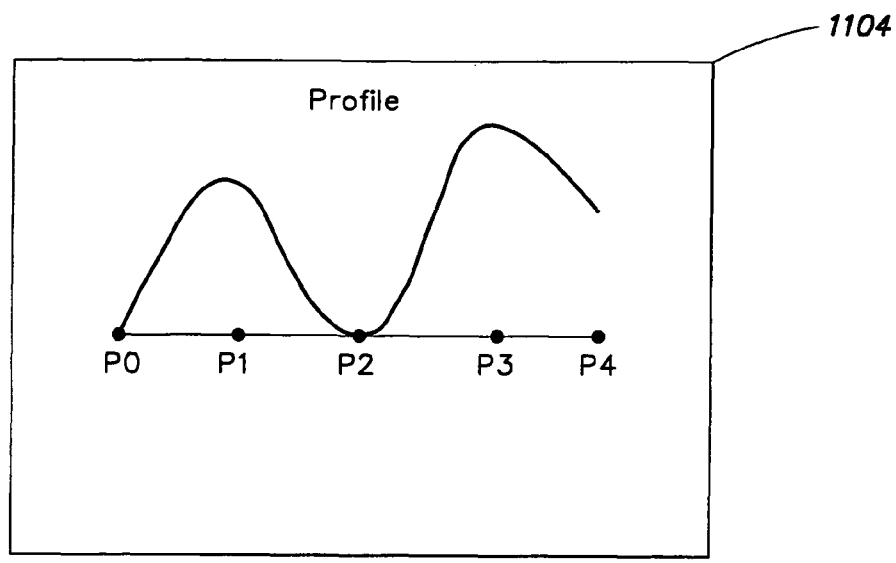
Figure 11D:
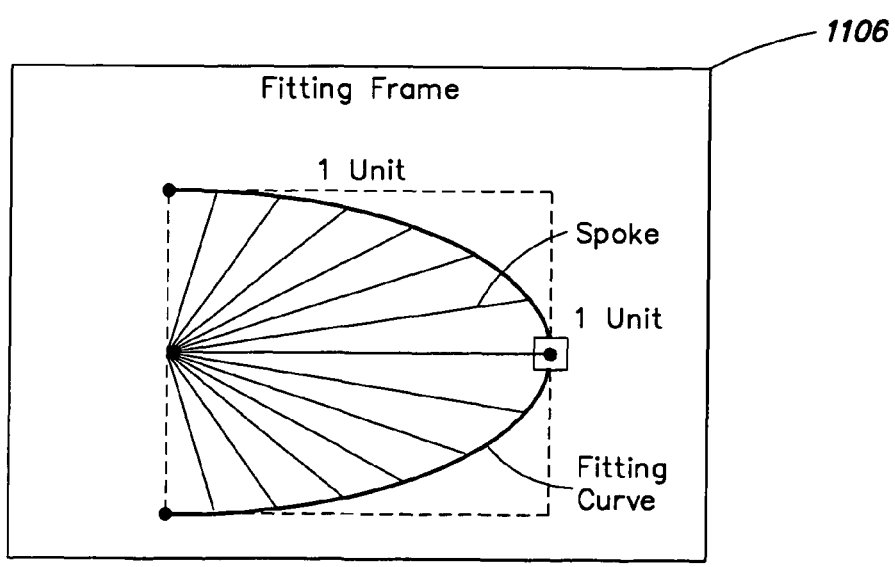
Figure 11E:
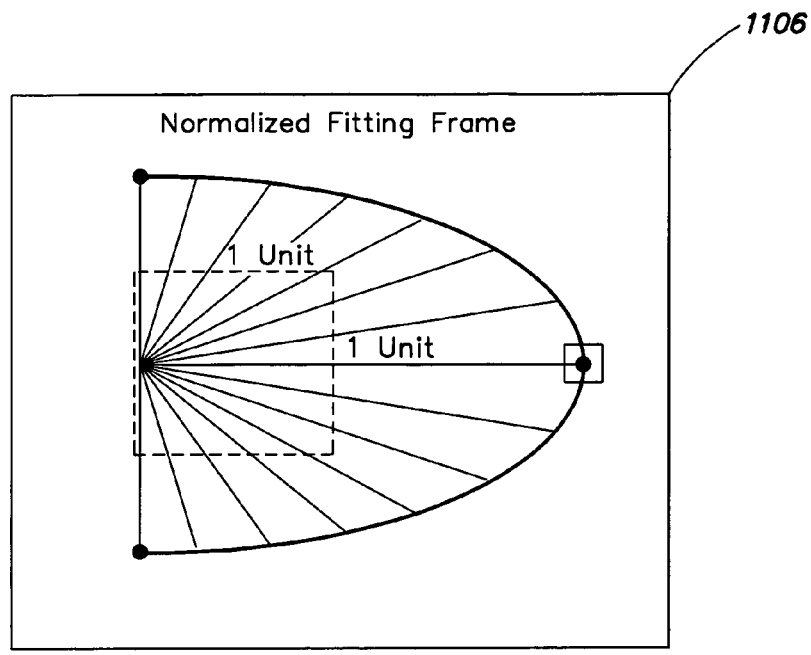
Figure 11F:
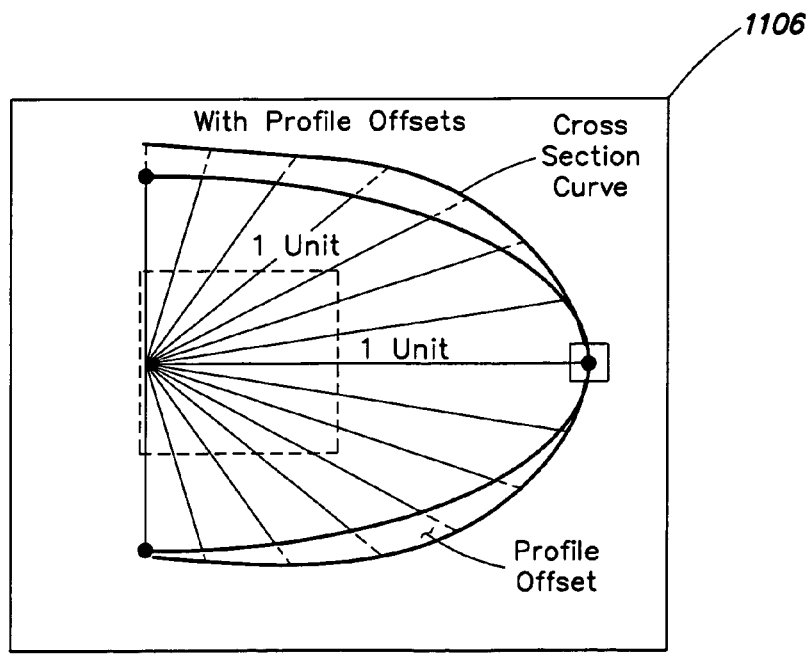
Figure 12C:
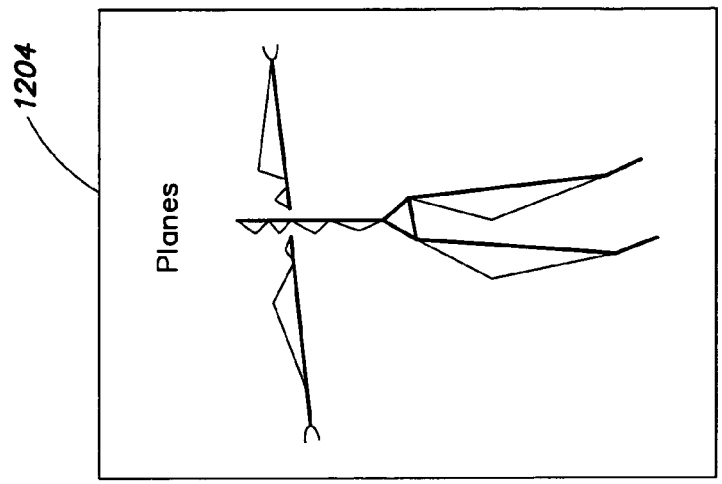
FIGS. 12A-I are diagrams of various layers that may be displayed in the graphical user interface of FIG. 1.
Figure 12B:
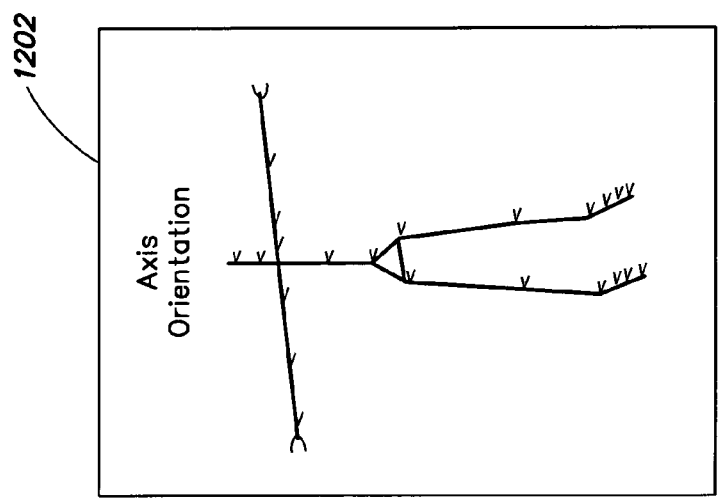
Figure 12A:
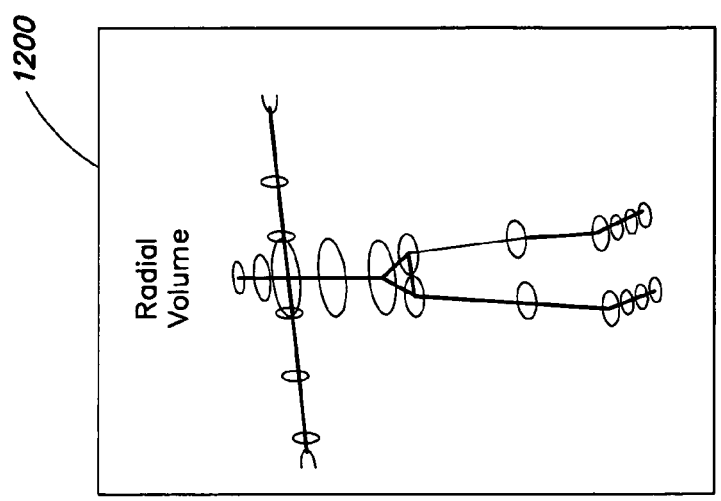
Figure 12D:
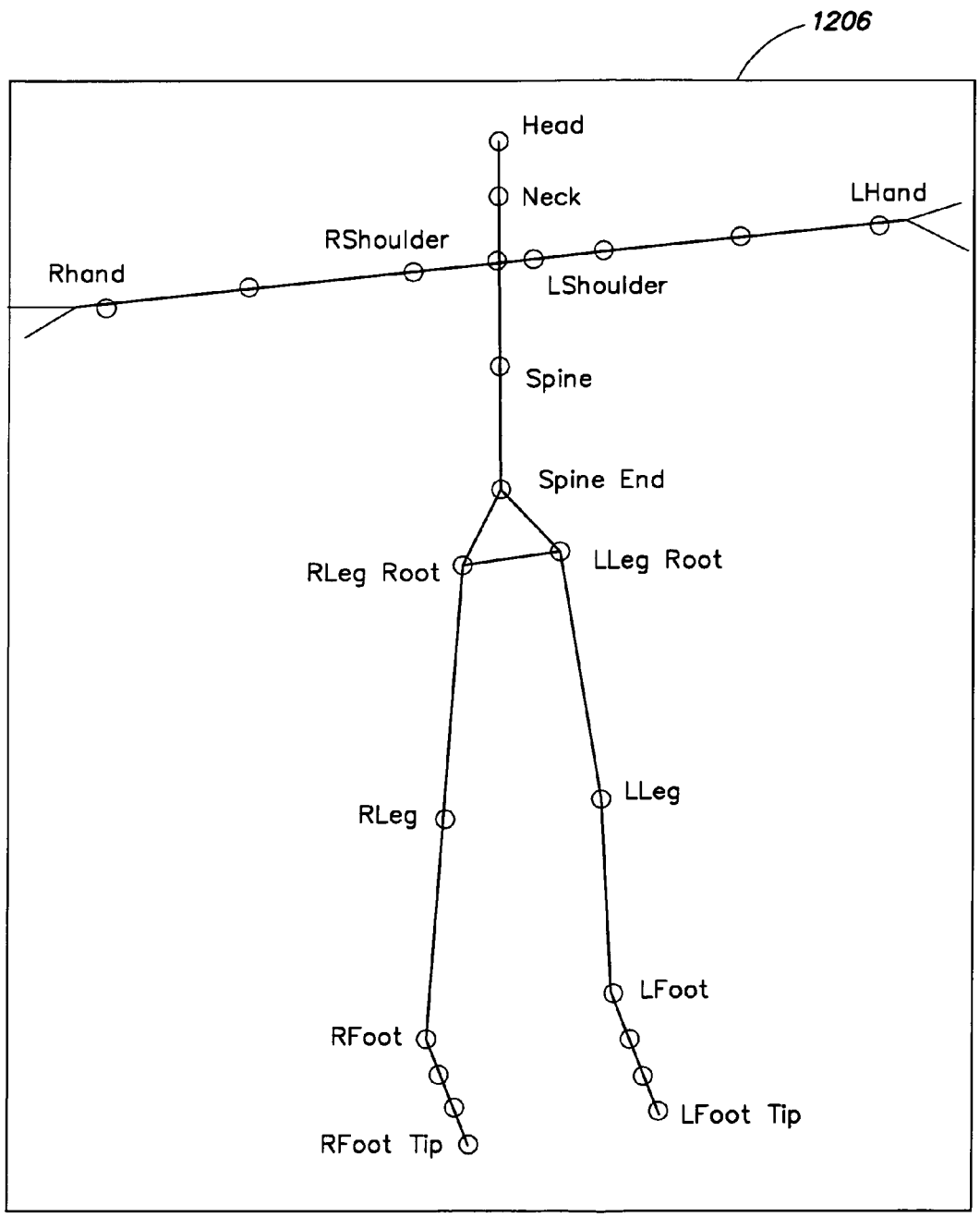
Figure 12G:
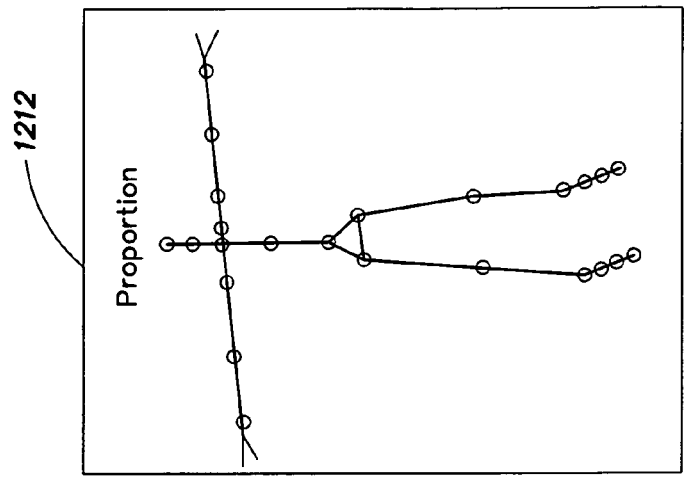
Figure 12F:
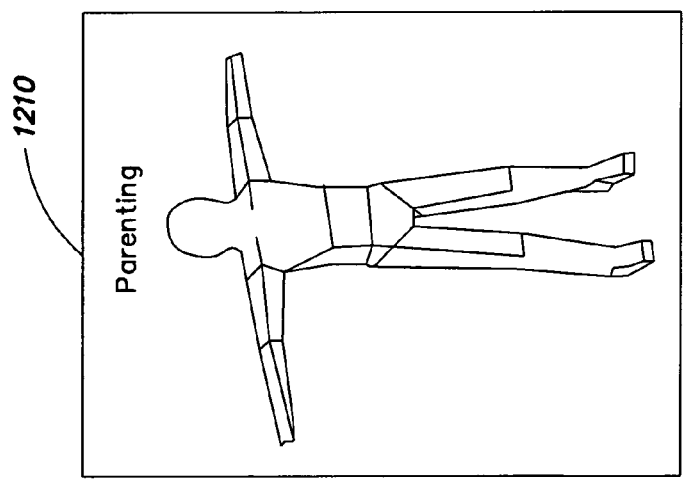
Figure 12E:
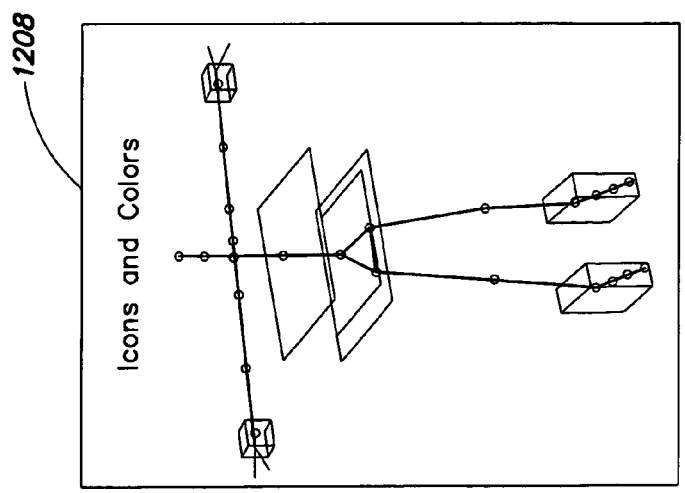
Figure 12H:
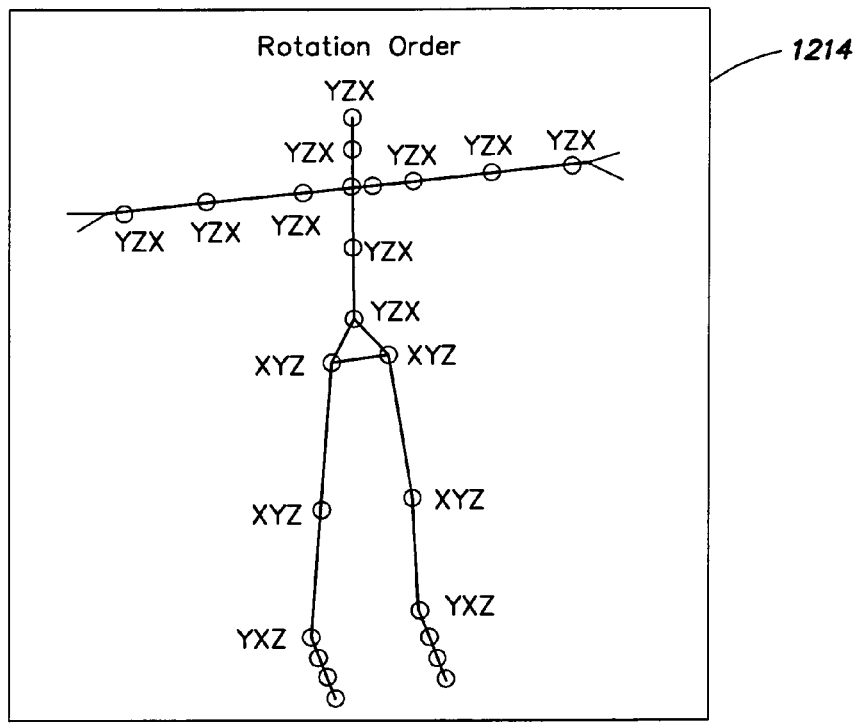
Figure 12I:
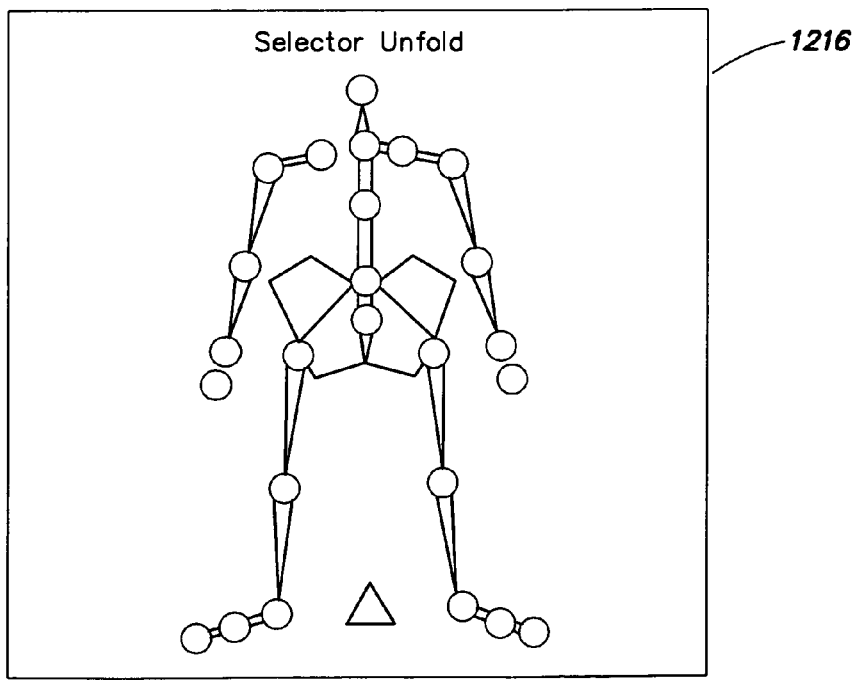

Another kind of operator for the mouth is for the lip corner. The guide curves for an example lip corner operator are illustrated in FIG. 10. The illustration of FIG. 10 shows the left side of the lip. A symmetrical operator would be provided for the right corner of the mouth. In particular, the lip corner point 1000, upper anchor point 1002 (typically the left upper lip point) and lower anchor point 1004 (typically the left lower lip point) are points that can be manipulated by the animator, either directly or indirectly. Their initial positions can be specified by the user during soft tissue solver construction.

An upper lip curve 1006 connects the upper anchor point 1002 to the lip corner point 1000. It is specified by three points, upper lip P1, upper lip P2 and upper lip P3, the position and orientation of which can be specified by the user during soft tissue solver construction.

A lower lip curve 1008 connects the lower anchor point 1004 to the lip corner point 1000. It is specified by three points, lower lip P1, lower lip P2 and lower lip P3, the position and orientation of which can be specified by the user during soft tissue solver construction.

A cross section curve 1010 connects to the lip corner point 1000 and defines a path along which the lip corner point moves. This curve may have a fixed point, such as cross section P4, which may be specified by the user. The cross section curve 1010 is specified by cross section points P1 through P4, and the lip corner point 1000. The shape, position and orientation of this curve can be specified by the user during soft tissue solver construction.

The lip corner cross section curve is used to define a lip corner profile curve, which is the deformation object for the lip corner. The lip corner profile curve is defined in a manner shown in FIG. 11. This technique is used to provide greater flexibility in defining the cross section curve. In FIG. 11, the cross section curve (shown at 1100) defined by points P1 through P4 and the lip corner point, as deployed (shown at 1102) is modified from a simple curve by adding offsets as defined by a profile function (shown at 1104). As shown at 1106, the fitting curve 1100 is divided into units by a number of spokes. Each of these spokes maps to a unit along the profile function. The profile offset corresponding to the spoke is added to the point on the fitting curve in the direction of the spoke. The cross section curve as deployed is defined by the curve passing through the points created by adding these offsets.

As noted above, the resulting soft tissue solver has several controllers, each of which is associated with one or more control objects, a change in which is used by a deformation operator to deform an associated deformation object. The position and orientation of each control object may be key framed. Because the various points and curves that are control objects are directly on the mesh, they also can correspond to positions for motion capture sensors on a corresponding live actor. Thus, motion capture data also can be used to control the position and orientation of each control object. Thus, key framed data and motion capture data can be applied to the same control object.

Also as noted above, different characters of the same type, i.e., generated from the same format file, will have soft tissue solvers with the same general structure. Therefore, motion, whether defined by motion capture or key framed animation, of the skin of the character can be retargeted from one character to another with relative ease. Attributes of the mesh relevant to its soft tissue solver also can be transferred to other objects.

With the variety of information provided in such soft tissue solvers the graphical user interfaces for the guide phase and the soft tissue solver, i.e., user interfaces 116 and 110 in FIG. 1, enable a user to view selected parts of the solver in the context of the character being viewed. As described above, the graphical user interface may, for example, show these details in the context of a rendering of the input mesh. However, there are many aspects of an animated object that a user might want to view. Thus the graphical user interface also may permit the user to select from one or more of the many layers of the object. Referring now to FIG. 12, some example user interface views are shown. The graphical user interface permits selecting any one or more of these parts of a mesh, soft tissue solver or other part of an object to provide context for editing parameters of the soft tissue solver. The example layers illustrated in FIG. 12 include, but are not limited to, the radial volume 1200 of the object, the axis orientation 1202 of its components, planes 1204 associated with its components, names 1206 of the components, icons and colors 1208 associated with the components, parenting relationships 1210 among the components, proportions 1212 of the components, rotation order 1214 of the components and an unfolding of the selectors for the components, as shown at 1216. The variety of layer selection improve the ability of the artist to visualize the various layers of information in the object.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for generating a soft tissue solver for a computer animation application executed by a processor, comprising:
   receiving a three-dimensional mesh;
   receiving input from a user that directly identifies one or more salient points on the three-dimensional mesh;
   computing, using the processor, locations of helper points on the three-dimensional mesh based on locations of the one or more salient points on the three-dimensional mesh, wherein the location of at least one helper point is defined as a percentage along a line between two salient points on the three-dimensional mesh;
   generating, based on the locations of the helper points on the three-dimensional mesh and the locations of the one or more salient points on the three-dimensional mesh, one or more guidelines associated with three-dimensional mesh; and
   automatically generating a soft tissue solver based on the one or more salient points on the three-dimensional mesh and the one or more guidelines associated with the three-dimensional mesh, wherein the soft tissue solver includes a deformation region represented by points in the three-dimensional mesh, a deformation object representing only a single weight associated with the deformation region and a displacement that is applied to the deformation region, and a deformation operator that specifies a deformation to the deformation object according to a change in a control object that is a point or curve on the three-dimensional mesh.

2. The computer implemented method of claim 1, wherein the soft tissue solver further comprises controllers associated with the control object, wherein the controllers are associated with salient points on the mesh.

3. The computer implemented method of claim 1, further comprising:
   receiving a format file that specifies a list of names of salient points;
   displaying the three-dimensional mesh to a user; and
   prompting the user to specify on the displayed three-dimensional mesh locations of the salient points.

4. The computer implemented method of claim 1, further comprising displaying information describing the soft tissue solver to the user, wherein the information describing the soft tissue solver is stored as layers, wherein one or more layers to be displayed is selectable by the user.

5. The computer implemented method of claim 3, wherein the format file further includes names of the helper points and parameters that specify a location of each of the helper points as a function of the one or more salient points.

6. The computer implemented method of claim 1, further comprising superimposing a high frequency deformation to the three-dimensional mesh after applying any deformation applied to the three-dimensional mesh by the deformation operator.

7. The computer implemented method of claim 1, wherein the deformation object is associated with the mesh by associating, with each vertex affected by the deformation object, a direction of displacement and a relative position of the vertex on the deformation object.

8. The computer implemented method of claim 7, wherein each vertex may be affected by more than one deformation operator.

9. The computer implemented method of claim 8, wherein a blending operation is performed when multiple deformation operators provide displacement to one or more vertexes.

10. The computer implemented method of claim 1, further comprising displaying to the user a user interface through which the direction of displacement and a relative position of the vertex on the deformation object can be modified through painting operations.

11. The computer implemented method of claim 1, wherein the three-dimensional mesh represents a face and the deformation operator is a lip curler that specifies a curve as the deformation object and a point on the lip as the control object, and wherein the deformation object further includes an outer limit curve and an inner limit curve limiting movement of the deformation object.

12. The computer implemented method of claim 1, wherein the three-dimensional mesh represents a face and the deformation operator is a lip corner that specifies a cross section curve, an upper lip curve and a lower lip curve as the deformation object and a point on an upper lip, a point on a lower lip and a point at a lip corner as the control object.

13. The computer implemented method of claim 1, wherein the weight is entered by the user.

14. The computer implemented method of claim 1, wherein the deformation operator is defined by an ease-in curve and a deformation curve, the ease-in curve indicating an ease-in percentage as a scaled percentage of the change of the control object and the deformation curve indicating a deformation percentage as a function of the ease-in percentage.

15. A method for creating computer-generated animation in an animation application executed by a processor of an object defined by a three dimensional mesh, comprising:
receiving a soft tissue solver including the three-dimensional mesh, wherein the soft tissue solver includes one or more control objects, wherein each of the control objects includes a point or curve on the three-dimensional mesh, one or more deformation objects associated with the mesh, wherein each of the deformation objects represents only a single weight associated with a deformation region of the three-dimensional mesh and a displacement that is applied to the deformation region, and one or more deformation operators, wherein each of the deformation operators is associated with one of the control objects and one of the deformation objects, and specifies deformation to the associated deformation object according to a change in the control object, and wherein deformation of the associated deformation object is associated with deformations of the three-dimensional mesh; and
permitting the user to separately manipulate each of the control objects to establish a pose,
wherein, via the processor, the soft tissue solver is generated based on one or more helper points on the three-dimensional mesh and one or more guidelines associated with the three-dimensional mesh, the one or more helper points are generated based on the locations of one or more salient points on the three-dimensional mesh identified by the user, the location of at least one helper point is defined as a percentage along a line between two salient points on the three-dimensional mesh, and the one or more guidelines are derived based on the helper points on the three-dimensional mesh and the locations of the one or more salient points on the three-dimensional mesh.

16. The method of claim 15, further comprising permitting the user to separately animate each of the control objects over time.

17. The method of claim 16, wherein the control objects may be animated using key frames.

18. The method of claim 16, wherein the control objects may be animated using motion capture data.

19. The method of claim 15, wherein the control objects can be positioned through manipulation of the salient points on the mesh.

20. The method of claim 19, wherein the salient points may be manipulated using key frames.

21. The method of claim 19, wherein the salient points may be manipulated using motion capture data.

22. The method of claim 15, wherein the deformation operators are implemented in a runtime real-time engine of a game system.

23. The method of claim 15, further comprising retargeting the animation to a second three-dimensional mesh.

24. The method of claim 15, wherein the three-dimensional mesh represents a face of a character.

25. The method of claim 24, wherein at least one of the deformation operators is a lip curler.

26. The method of claim 24, wherein at least one of the deformation operators is a lip corner.

27. The method of claim 15, wherein the deformation operator is defined by an ease-in curve and a deformation curve, the ease-in curve indicating an ease-in percentage as a scaled percentage of the change of the control object and the deformation curve indicating a deformation percentage as a function of the ease-in percentage.

* * * * *